(12) United States Patent
Kemp et al.

(10) Patent No.: US 11,617,354 B2
(45) Date of Patent: *Apr. 4, 2023

(54) MULTI-PHASIC INTEGRATED SUPER-INTENSIVE SHRIMP PRODUCTION SYSTEM

(71) Applicant: ROYAL CARIDEA LLC, Avondale, AZ (US)

(72) Inventors: Maurice C. Kemp, Litchfield Park, AZ (US); Anthony P. Brand, Coker, AL (US)

(73) Assignee: ROYAL CARIDEA LLC, Avondale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,567

(22) Filed: Dec. 16, 2021

(65) Prior Publication Data

US 2022/0104466 A1 Apr. 7, 2022

Related U.S. Application Data

(63) Continuation of application No. 15/525,271, filed as application No. PCT/US2016/017588 on Feb. 11, 2016, now Pat. No. 11,206,817.

(60) Provisional application No. 62/140,392, filed on Mar. 30, 2015.

(51) Int. Cl.
*A01K 61/59* (2017.01)
*A01K 61/85* (2017.01)

(52) U.S. Cl.
CPC .............. *A01K 61/59* (2017.01); *A01K 61/85* (2017.01); *Y02A 40/81* (2018.01)

(58) Field of Classification Search
CPC ........ A01K 61/59; A01K 61/80; A01K 61/85; A01K 63/006
See application file for complete search history.

(56) References Cited

U.S. PATENT DOCUMENTS

| | | | |
|---|---|---|---|
| 2,302,336 A | 11/1942 | MacDonald |
| 3,473,509 A | 10/1969 | Miyamura |
| 3,495,572 A | 2/1970 | Groves |
| 3,766,888 A | 10/1973 | Wiegardt, Jr. |

(Continued)

FOREIGN PATENT DOCUMENTS

| CN | 103548738 A | 2/2014 |
|---|---|---|
| CN | 203618520 U | 6/2014 |

(Continued)

OTHER PUBLICATIONS

"Conex box" from Wikipedia (Year: 2020).

(Continued)

*Primary Examiner* — Peter M Poon
*Assistant Examiner* — Morgan T Jordan
(74) *Attorney, Agent, or Firm* — Fogarty LLP

(57) ABSTRACT

A method for shrimp aquaculture, in which, all growth phases and essential operations are modularized and integrated to form a multi-phasic synchronous super-intensive shrimp production system controlled by a custom designed cyber-physical platform. Modular components include, for example, post-larvae nursery modules, grow-out production modules, recirculating aquaculture system (RAS) modules, feed distribution modules, and regulatory elements comprised of Program Logic Controllers (PLCs) integrated with Human Interface Modules (HIMs).

20 Claims, 12 Drawing Sheets

(56) References Cited

U.S. PATENT DOCUMENTS

| | | | |
|---|---|---|---|
| 4,144,840 | A | 3/1979 | Bubien |
| 4,198,924 | A | 4/1980 | Chapman |
| 4,226,210 | A | 10/1980 | Lockwood et al. |
| 4,244,486 | A | 1/1981 | Ewald, Jr. |
| 4,276,710 | A | 7/1981 | Yunker et al. |
| 4,368,691 | A | 1/1983 | Brune |
| 4,394,846 | A | 7/1983 | Roels |
| 4,440,109 | A | 4/1984 | Dugan et al. |
| 4,467,743 | A | 8/1984 | Dugan et al. |
| 4,559,902 | A | 12/1985 | Mason et al. |
| 4,726,321 | A | 2/1988 | Malone et al. |
| 5,133,287 | A | 7/1992 | Hicks |
| 5,143,019 | A | 9/1992 | Zane |
| 5,377,622 | A | 1/1995 | Lauttenbach et al. |
| 5,377,624 | A | 1/1995 | Craig et al. |
| 5,474,030 | A | 12/1995 | Pittet et al. |
| 5,961,831 | A | 10/1999 | Lee et al. |
| 5,979,362 | A | 11/1999 | McRobert |
| 6,006,471 | A | 12/1999 | Sun |
| 6,039,005 | A | 3/2000 | Themar |
| 6,357,392 | B1 | 3/2002 | Ido |
| 6,363,889 | B1 | 4/2002 | Lamendola |
| 6,398,959 | B1 | 6/2002 | Teran et al. |
| 2003/0070624 | A1 | 4/2003 | Zahar et al. |
| 2003/0154926 | A1 | 8/2003 | Untermeyer et al. |
| 2005/0120970 | A1 | 6/2005 | Massingill et al. |
| 2005/0263090 | A1 | 12/2005 | Tunze |
| 2006/0042556 | A1 | 3/2006 | Hsiao |
| 2006/0138034 | A1 | 6/2006 | Weng |
| 2007/0245971 | A1 | 10/2007 | Rayner |
| 2007/0251461 | A1 | 11/2007 | Reichard et al. |
| 2008/0011679 | A1 | 1/2008 | Champagne et al. |
| 2009/0139456 | A1 | 6/2009 | Lin |
| 2009/0206044 | A1 | 8/2009 | Van |
| 2010/0236137 | A1 | 9/2010 | Wu et al. |
| 2010/0269761 | A1 | 10/2010 | Nien |
| 2010/0294202 | A1 | 11/2010 | Lawrence |
| 2010/0313813 | A1 | 12/2010 | Brocca et al. |
| 2012/0031346 | A1 | 2/2012 | Rosenstein et al. |
| 2012/0204801 | A1 | 8/2012 | Lawrence et al. |
| 2012/0312243 | A1 | 12/2012 | Rusch |
| 2013/0036983 | A1 | 2/2013 | Adatto et al. |
| 2013/0312669 | A1 | 11/2013 | Steffen |
| 2014/0020292 | A1 | 1/2014 | McNamara et al. |
| 2014/0041596 | A1 | 2/2014 | Fujiyoshi |
| 2014/0364971 | A1 | 12/2014 | Minvielle |
| 2015/0196013 | A1 | 7/2015 | Chen et al. |
| 2015/0237890 | A1 | 8/2015 | Grajcar |
| 2015/0250113 | A1 | 9/2015 | Shoham et al. |
| 2015/0250134 | A1 | 9/2015 | Hicks |
| 2015/0296840 | A1 | 10/2015 | Jones |
| 2015/0342156 | A1 | 12/2015 | Sheriff |
| 2016/0113251 | A1 | 4/2016 | Urup |
| 2016/0174531 | A1 | 6/2016 | Boothe et al. |
| 2016/0200601 | A1 | 7/2016 | Clark |
| 2016/0242396 | A1 | 8/2016 | Fredricks |
| 2018/0213735 | A1 | 8/2018 | Vail et al. |

FOREIGN PATENT DOCUMENTS

| | | | |
|---|---|---|---|
| CN | 104206320 | A | 12/2014 |
| EP | 2818864 | A1 | 12/2014 |
| FR | 2440338 | A1 | 5/1980 |
| GB | 1291457 | A | 10/1972 |
| WO | 0003586 | A2 | 1/2000 |
| WO | 2008114300 | A2 | 9/2008 |
| WO | 2009072982 | A1 | 6/2009 |
| WO | 2016160141 | A1 | 10/2016 |

OTHER PUBLICATIONS

International Search Authority, "International Search Report," International Application No. PCT/US2016/017588, dated May 30, 2016, 4 pages, publisher EPO, Rijswijk, Netherlands.

International Search Authority (ISA), "Written Opinion of the International Searching Authority," PCT/US2016/017588, dated May 30, 2016, 9 pages, publisher EPO, Rijswijk, Netherlands.

International Preliminary Report On Patentability—Chapter I, "Written Opinion," PCT/US2016/017588, dated Oct. 3, 2017, 10 pages, publisher The International Bureau of WIPO, Switzerland.

Durwood M. Dugger, "Intensive Shrimp Production Economic Challenges," Biocepts International, Inc., Sep. 29, 2011, 5 pages.

Victor Oiestad, "Hyper-Intensive Fish Farming Shallow Raceways Save Space, Water," Global Aquaculture Alliance, The Advocate, Jun. 2001, 2 pages.

Will Flanery, et al., "Brief Description of the Larcose Shrimp Counter" Aquaculture America 2013, Nashville, Tennessee, Feb. 21-25, 2013, 7 pages.

Velocio Networks, Inc., "Ace PCL," Velocio.net, Oct. 2014, 9 pages.

Velocio Networks, Inc., "Branch PCL", Velocio.net, Oct. 2017, 13 pages.

Moss, S.M., "Shrimp Aquaculture", Research, Education, and Economics Information System (REEIS) of the U. S. Department of Agriculture (USDA), Oceanic Institute Makapuu Point, Aug. 1, 2010, 12 pages.

"Examination Report No. 1 for standard patent application," dated Oct. 16, 2019, 4 pages, publisher IP Australia.

Vietnamese 1st Examination Report, "Multi-Phasic Integrated Super-Intensive Shrimp Production System and a Method for having a Synchronous Production Cycle of Mature Shrimp," Vietnam Patent Application No. 1-2017-01687, dated Dec. 1, 2020, 4 pages, publisher Ministry of Science and Technology Intellectual Property Office of Vietnam.

Communication pursuant to Article 94(3) EPC, European Application No. 16 711 377.8-1011, dated Oct. 26, 2020, 12 pages, publisher European Patent Office, Rijswijk, Netherlands.

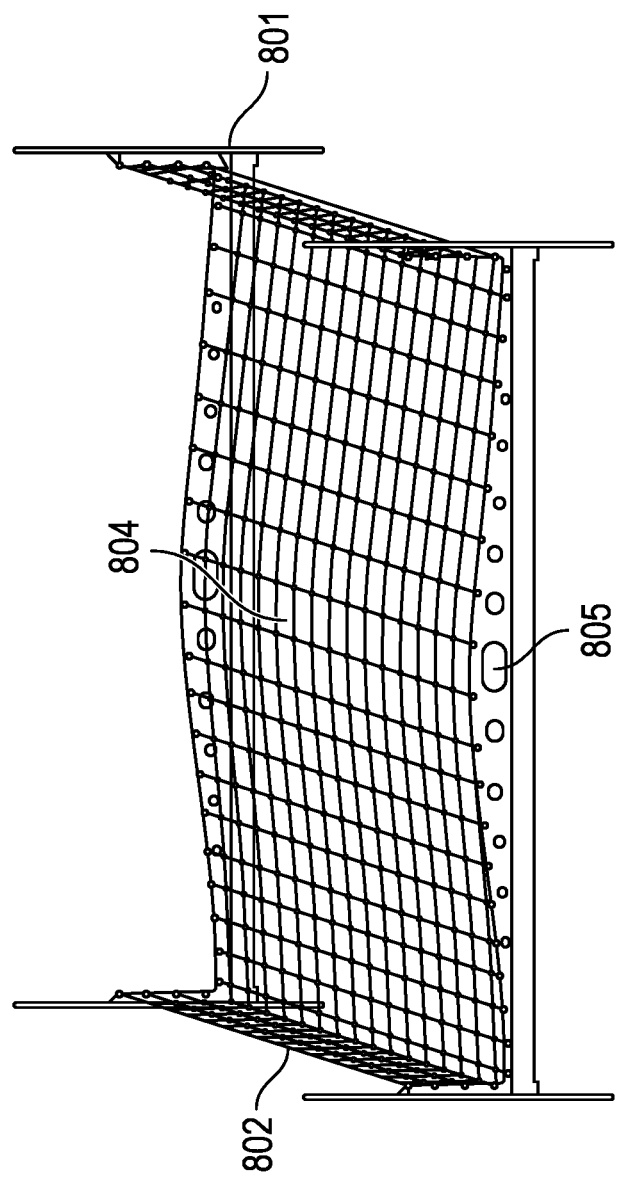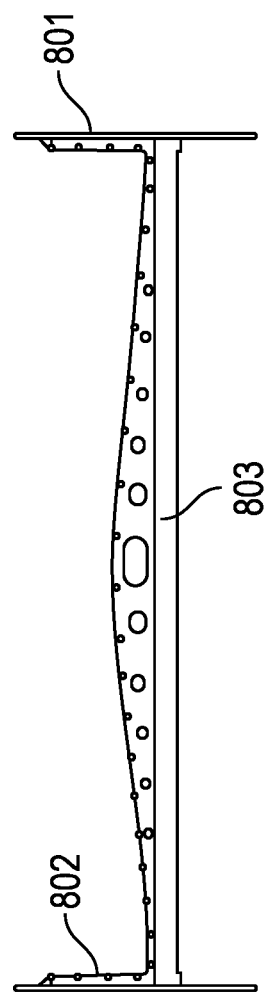
FIG. 8A
FIG. 8B

Table 1: Four Phase Super-Intensive Shrimp Production Model

| Grow Out Phase | Production Sub-Unit | Sub-Unit Area Square Meters | Shrimp Per Square Meter | Shrimp Per Sub-Unit | % Survival | Shrimp Per Sub-Unit | Shrimp Per Square Meter | Weight of Shrimp at End of Each Phase (gr) | Biomass (kg) Per Square Meter of Sub-Unit | Biomass (kg) Per Sub-Unit |
|---|---|---|---|---|---|---|---|---|---|---|
| 2 | 1 | 39 | 560 | 21,840 | 90 | 19656 | 504 | 7 | 3.5 | 138 |
| 3 | 2 | 39 | 252 | 9,828 | 95 | 9337 | 239 | 15 | 3.6 | 140 |
| 3 | 3 | 39 | 252 | 9,828 | 95 | 9337 | 239 | 15 | 3.6 | 140 |
| 4 | 4 | 39 | 114 | 4,427 | 98 | 4338 | 111 | 26 | 2.9 | 113 |
| 4 | 5 | 39 | 114 | 4,446 | 98 | 4357 | 112 | 26 | 2.9 | 113 |
| 4 | 6 | 39 | 114 | 4,427 | 98 | 4338 | 111 | 26 | 2.9 | 113 |
| 4 | 7 | 39 | 114 | 4,427 | 98 | 4338 | 111 | 26 | 2.9 | 113 |

Total Weight of 26g Shrimp Harvested Per Crop = 452kg
Total Weight of 26g Shrimp Harvested Per Year (13 Crops) = 5846kg

FIG. 11

MULTI-PHASIC INTEGRATED SUPER-INTENSIVE SHRIMP PRODUCTION SYSTEM

RELATED APPLICATIONS

This application is a continuation of pending U.S. application Ser. No. 15/525,271, filed May 8, 2017, which claims priority to PCT/US2016/017588, filed Feb. 11, 2016, which claims priority to U.S. Provisional Application No. 62/140,392, filed Mar. 30, 2015, the disclosures of which are hereby incorporated herein in their entireties.

BACKGROUND

Aquaculture is at a crossroads. Facing the pressure of driving higher rates of production per unit area, aquaculture has the opportunity to learn from the mistakes of others and embrace sustainable management practices. This young industry's long-term success and economic viability depends on innovation and solutions aimed at tackling the triple sustainability challenge of disease, waste, and feed in parallel with its current explosive global demand driven expansion. World-wide shrimp production practices are unsustainable because of:

Climate and geographic restrictions
Ecological Limitations—land destruction
Feed Concerns—fishmeal content
Labor Abuse and social breakdown
Shrimp Disease—Acute Hepatopancreatic Necrosis Syndrome (APNS) or Early Mortality Syndrome (EMS), Taura virus, White spot virus (WSSV), enterocytozoon hepatopennai (EHP) caused by fungi, etc.
Human Health Concerns (feed additives including banned chemicals and antibiotics)
Processing—Sanitation procedures or lack thereof
Locavore movement and lifestyle Expanding on the above, Shrimp are the most preferred seafood consumed in the US. However, there is a huge disparity between domestic demand and domestic supply resulting in a reliance on imported products and a growing federal trade deficit in shrimp. In addition to concerns about the quantity of shrimp imported into the US, the quality of imported shrimp may be inferior to domestically grown shrimp and there are human health concerns about antibiotic residues that are shown to be present in some imported products. The US Food and Drug Administration is charged with inspecting seafood imported into the US, but this agency is only able to inspect a small percentage of products that make their way into US markets.

In light of a growing federal trade deficit in shrimp products, and concerns about food safety, there are compelling reasons to support a US shrimp farming industry. Expanding the US shrimp farming industry using traditional approaches is not feasible due to concerns about environmental pollution, disease transmission, cost of production and climatic issues. Traditionally, shrimp have been cultured in coastal ponds where flowthrough water exchange is used to maintain acceptable water quality. However, influent water can serve as a vector for virulent shrimp pathogens and pond effluent can adversely affect coastal water quality. In addition, expanding shrimp farms in coastal areas may cause multiple-use conflicts and traditional shrimp farms are restricted to more southern latitudes because of the warmwater requirements of shrimp (Moss, S. M., "Shrimp Aquaculture," The Research, Education, and Economics Information System (REEIS) of the U.S. Department of Agriculture (USDA), Oceanic Institute Makapuu Point, 1 Aug. 2010, Web, 31 Jul. 2012).

With respect to sustainability of land based industrial shrimp farming, things drastically changed around three decades ago with the introduction of land-based aquaculture, particularly in Southeast Asia and Latin America. Aquaculture processes changed from traditional, small-scale and low-impact to industrial, large-scale, high-impact production approaches, with seafood export, not local use, in mind. As the industry expanded its reach into the international marketplace, the rate of destruction of the natural environment and the related adverse consequences for local communities accelerated. The ecological footprint increased logarithmically, and destruction followed. Along with environmental destruction, incidence of disease followed: Taura virus, White spot virus (WSSV), Infectious Hypodermal and Hematopoetic Necrosis Virus (IHNNV), Acute Hepatopancreatic Necrosis Syndrome (APNS) or Early Mortality Syndrome (EMS) caused by bacteria, and enterocytozoon hepatopennai (EHP) caused by fungi, etc.

The history of shrimp farming in the United States is both brief and volatile. Feasibility of growing Pacific white shrimp (*Litopenaeus vannamei*) in the United States on an industrial scale was demonstrated three decades ago, with this development, shrimp farming in the U.S. became commercially achievable in the early 1980s with increasing production levels obtained until the early 2000s. The first technology that allowed for widespread farming in the U.S. was the single phase semi-intensive pond model, in which post-larvae obtained from the hatchery are directly stocked into the ponds. Using this process production of 5-10 MT/ha/crop could be achieved. However, only one crop per year could be produced because of climatic conditions. Thus, shrimp farming in the United States became economically non-competitive relative to tropical areas where multiple crops per year are the norm. This has resulted in a rapid decline in shrimp farm production in the U.S. since the early 2000s. In effect shrimp production moved offshore. Today the United States consumes >600,000 tons of shrimp per year. Wild capture and farmed shrimp fill <3% of the USA demand. US shrimp import value climbed 67% in 2014. Domestic aquaculture meets "<1%" of American consumption.

Despite the seeming advantages of shrimp production in the tropics, there are untenable issues. Production in the tropics is not sustainable, nor is it consistent with the locavore movement. Increasingly people throughout the world do not trust the source of their food because production is favored at all costs even if it means adulteration with harmful chemicals or unsanitary processing of the product. Aside from the distrust, there is recognition that food should be produced in a sustainable manner and current technology does not reflect this driving force.

It was recognized more than a decade ago that change was essential given American demand. American Federal and State Governments bordering the Gulf of Mexico and southern Atlantic region supported research directed towards development of a new technology that will allow U.S. farmers to compete with year-round production in the tropics. In essence new technology had to be developed and implemented.

Any technologic development(s) must accommodate geographic and climatic demands, i.e., land use should be minimized and environmental modification (temperature) necessary for shrimp growth must not be energy intensive. The only way this could be accomplished was to situate production indoors, i.e., inside structures such as enclosed warehouses. In turn this allowed production closer to the consumer, whether that person is an American or any other citizen of the world. However, simply replicating pond growing conditions indoors was not acceptable because warehouse structures would have to be enormous, i.e., occupy many acres (hectares) and be energy intensive. In order to minimize issues described above, vertical farming techniques has been considered.

Description of vertical aquaculture in stacked raceways dates back to at least 1973. Durwood Duggar pointed out that King James used stacked raceways in the 80s to culture shrimp. (Duggar, D., Title "Intensive Shrimp Production Economic Challenges" BioCepts International, Inc., Web, 29 Sep. 2011). Even before that, Ron Wulff and Durwood Duggar developed a stacked raceway system in 1973 for the Ralston Purina Mariculture Research Center's intensive shrimp production efforts. Beyond shrimp aquaculture, fish aquaculture using water as shallow as 10 cm in stacked raceways for hyper-intensive fish farming, has been practiced since at least 2001 (Oiestad V., "Hyper-Intensive Fish Farming, Shallow Raceways Save Space, Water," Global Aquaculture Alliance, Web, 1 Jun. 2001). Although vertical stacking for aquaculture having been described, the challenge remains how to put such a space saving model into industrial production and practice. Remaining to be resolved was energy conservation issues, structural engineering issues, maintenance of water quality, temperature, dissolved oxygen, feed distribution and how to integrate the process while maintaining control. Such problems have been resolved with the current invention, wherein the basic operations of shrimp production are modularized and integrated to form a multi-phasic synchronous super-intensive shrimp production system controlled by a custom designed cyber-physical platform that acquires data through sensors embedded in the production sub-unit module, recirculating aquaculture system (RAS) module, and feed distribution module, allowing control of one or more equipment devices communicating with the Program Logic Controllers (PLC's) integrated with Human Interface Modules (HIMs) through coupled feed-back loops for maintaining an aquaculture environment for a synchronous production cycle of shrimp.

SUMMARY

The present disclosure generally pertains to the design and integration of modular components including a nursery, stacked production assembly, water recycling aquaculture system (RAS) and feed distribution equipment along with computer control equipment into a multi-phasic super-intensive shrimp production system that operates synchronously, allowing for 12 to 17 production cycles (crops) per year. The integrated system is designed to eliminate production constraints inherently present from the time post larvae ("PLs") are stocked until shrimp are harvested at completion of grow-out thereby maximizing through-put.

Central to any production model is the carrying capacity or biomass per unit area the system can support. Research has shown that shrimp can be grown consistently at a biomass of 4 kg/m$^2$ in shallow water tanks. When this limitation is applied to a single-phase production system, such as a land-based pond, tank or raceway, the biomass at the end of the grow-out cycle is a determinant of how much shrimp can be produced. Therefore, while thousands of PLs can be stocked and still not exceed a biomass of 4 kg/m$^2$ initially, the carrying capacity will be quickly exceeded and the system will crash. A multi-phasic synchronous production system alleviates this constraint since carrying capacity of the system is not exceeded at any stage or phase of the production cycle, i.e., from stocking to harvest.

Operating from a conservative perspective, one of many possible shrimp production models based on a biomass of ~3 kg/m$^2$ and a multi-phasic production cycle, is presented in FIG. 1 and Table 1 (FIG. 11). In this model, four phases are employed. In practice Phase 1 is executed by stocking PLs into a nursery where they are raised to a juvenile stage (0.7-1 g) for ~1 month (Table 1). Phase 2 is executed by transferring the juvenile shrimp to production subunit #1, otherwise known as a raceway, of the production module. When the biomass begins to exceed carrying capacity of the system, i.e., after ~4 weeks of growth, the shrimp density is reduced by sub-dividing the shrimp evenly between production sub-units #2 and #3 (Phase 3). Transfer is accomplished by gravity, i.e., a connecting tube is installed between production subunit #1 and #2 or subunit #1 and #3. Shrimp suspended in water are moved from the superior production sub-unit, i.e., #1, to the descendent #2 or #3 production sub-units by gravity. Integral to establishing a synchronous production cycle, as soon as #1 is emptied it is restocked with juvenile shrimp transferred from the nursery in order for the cycle to be reinitiated.

After ~4 additional weeks, the carrying capacity of #2 and #3 have been exceeded. The shrimp biomass cannot just be reduced by sub-dividing contents into #4 and #5. The carrying capacity or biomass of the next phase should be considered. At the end of the monthly cycle the weight of each shrimp will have increased substantially. This being the case, shrimp numbers should be reduced. The shrimp number is reduced in this case by evenly dividing the contents of Sub-unit No. 3 into sub-unit No. 4 and No. 5. Likewise, the shrimp contents of sub-unit No. 2 is evenly divided into sub-units No. 6 and sub-unit No. 7. After an additional period, i.e., ~4 weeks, shrimp weighting ~26 g are harvested from sub-Units Nos. 4, 5, 6 and 7 and can be offered for sale.

Alternatively, a five-phase model can be employed (see FIG. 2). In this model, Phase 1 is executed by stocking PLs into a nursery where they are raised to a juvenile stage (0.7-1 g) for ~1 month. Phase 2 is executed by transferring the juvenile shrimp to production sub-unit #1 of the production module. The same thing applies to the five-phase model as the four-phase model described above, i.e., when the biomass begins to exceed carrying capacity of the system, i.e., after ~4 weeks of growth, the shrimp density should be reduced. This is accomplished by sub-dividing the shrimp evenly between production sub-units #2 and #3 (Phase 3). After ~4 additional weeks, the carrying capacity of #2 and #3 will again have been exceeded. The shrimp numbers cannot simply be reduced by transferring the contents of #2 and #3 to #4 and #5 because in a short period of time the carrying capacity of #4 and #5 will be greatly exceeded. Instead, a partial harvest of shrimp should be carried out and the remainder of the shrimp in #2 and #3 can then be transferred to #4 and #5. After an additional period, i.e., ~4 weeks, another partial harvest is executed for the reasons described above and the remainder of the shrimp in #4 and #5 are transferred to #6 and #7, respectively, for final grow out. When in synchronous production shrimp weighting around 15, 24 and 30 g can be offered for sale at the end of each monthly cycle. Using the model described, 13 shrimp crops can be produced per year.

Whether a four or five phase model is employed, both are dependent on understanding the chemical, physical and biological conditions necessary for shrimp culture. Being heterotherms, *Litopenaeus vannamei* (Pacific white-leg shrimp) should be maintained at sustainable temperatures in the range of about 21° C.-37° C. However, even more importantly temperature should be highly regulated to maximize life functions. For practical purposes this means the environmental temperature should be maintained within a narrow range of 30-32° C., with 31° C. being preferred. The temperature constraints in most climatic areas including the tropics impose conditions outside the optimal. In addition to environmental temperature, water quality is central to shrimp production. Three different approaches have been employed: these include a non-recirculating system, a recirculating aquaculture system (RAS), and a refined flow through system from a natural source. While there are many variations in terms of aquaculture, all shrimp systems must address water quality issues with respect to salinity, solid waste removal, dissolved oxygen control, ammonia-nitrogen control, carbon dioxide control, pH (alkalinity). The only system that allows for control as it relates to the current disclosure is a RAS variant.

An understanding of the chemical, physical and biological conditions necessary for shrimp culture, allowed shrimp farming to rapidly develop in the USA. However, the history of shrimp farming in the United States is both brief and volatile from an economic perspective. Pacific white shrimp (*Litopenaeus vannamei*) was quickly and widely accepted as the most feasible species for large-scale shrimp production in the United States. Shrimp farming in the U.S. rapidly expanded in the early 1980s with increasing production levels until the early 2000s. The first technology that allowed widespread farming in the U.S. was the single phase semi-intensive pond model, in which PLs obtained from a hatchery were directly stocked in ponds. Using this process, production levels of 5 plus metric tons per hectare per crop (MT/ha/crop) were obtainable. However, due to climatic considerations only one crop was possible per year. Relative to tropical shrimp farming practices American farms were non-competitive. Shrimp farming moved offshore and a rapid decline in land-based shrimp farm production in the U.S. since the early 2000s followed.

Recognition of the circumstances delineated above motivated researchers to develop technology that will allow U.S. farmers to counter the economic advantages of year-round production in the tropics. Technology described in U.S. Pat. No. 8,336,498, was developed in part to address these issues.

The technology described in U.S. Pat. No. 8,336,498, is limited in scope, and deals with a subset of aspects related to shrimp production. Stacked raceways were used for shrimp aquaculture as early as 1973 and more recently have become standard practice in fish aquaculture (see above). Stacked raceways by themselves are simply one factor in the design of an integrated systems approach to shrimp aquaculture as disclosed herein.

All aquaculture systems (i.e., ponds, tanks, or stacked raceways, etc.) contain physical and biological limitations as to the number and biological mass of shrimp that can be grown per square meter of water footprint. Many factors go into this limitation and generally relate to the chemical and physical stress placed on the shrimp. A multi-phasic approach to production of shrimp is designed to mitigate stress and carrying capacity limitations.

Thinking inside the box, the present disclosure relates generally to design, and operation of an integrated multi-phasic super-intensive shrimp production system comprised of modular sub-units. The sub-components are designed to be assembled in structural units comprised of intermodal containers, freight containers or sea cans constructed of reusable steel, or similar types of structures. All sub-units are purpose built as are the intermodal containers that are made for efficient secure storage, structurally rigid and stackable.

The modules are custom designed and include a shrimp nursery for PLs, production assemblies comprised of production sub-units fabricated and constructed in rigid self-supporting containers, a recycling aquaculture system (RAS) for processing water, a computer-controlled feed distribution system and computer station connected to each module for operation of the integrated multi-phasic shrimp production system.

Embodiments of the current disclosure may achieve one or more of the following advantages:

Aquaculture of shrimp using a total water volume per weight of shrimp produced significantly less than with conventional techniques.

Aquaculture of shrimp in significantly lower average water depths (e.g., as low as 2.5 cm, or 2-3 times lower) than conventional techniques.

Aquaculture of shrimp using significantly less area (e.g., floor space) per weight of shrimp than obtained with conventional techniques.

Aquaculture of shrimp achieving significantly greater shrimp production per $m^2$ of water footprint, i.e., >100 kg shrimp/$m^2$ of water footprint/yr. Stated another way, production capacity is >1,000,000 kg/ha water footprint/yr.

Aquaculture of shrimp at higher densities per square meter than obtained with conventional techniques.

Aquaculture of shrimp achieving significantly greater survival, i.e., >80% survival, even at production levels greater than 100 kg/$m^2$ of water footprint.

Aquaculture of shrimp using feed system optimize for growth.

Aquaculture of shrimp using a feed system that allows feeding of shrimp to satiation 24 hr. a day.

Aquaculture of shrimp using a feed system allowing for appropriate size feed proportional to weight of shrimp.

Aquaculture of shrimp using a floating feed manufactured using extrusion cooking.

Aquaculture of shrimp using a computer-controlled point distribution system.

Aquaculture of shrimp using advanced engineering that deploys a custom cyber-physical platform developed for environmental sensing including: water temperature, salinity, dissolved oxygen, turbidity, nitrogen containing metabolites, acoustic sensors (level of feed consumption), etc.

Aquaculture of shrimp using equipment engineered and designed to isolate production from the environment so as to allow for operations independent of geographic and climatic restrictions.

Aquaculture of shrimp in vertically stacked production sub-units installed in intermodal containers thereby allowing for rethinking structural support equipment and design.

Aquaculture of shrimp using synchronous production cycles. Production no longer is a batch process.

BRIEF DESCRIPTION OF THE DRAWINGS

A more complete and through understanding of the present embodiments and advantages thereof may be acquired by referring to the following description taken in conjunction with the accompanying drawings, in which like reference numbers indicate like features and wherein:

FIG. 8A illustrates the stainless-steel wire fabricated as to form a sub-frame over which 100 mil high density polyethylene (HDPE) is arranged to form a water compartment. FIG. 8B illustrates a cross-section through a production sub-unit showing details of a cross brace to which support brackets attached. Support brackets support the weight of the production sub-unit when welded to the wall of an intermodal container.

FIG. 11 depicts data for a shrimp production model according to an example embodiment (Table 1).

DEFINITIONS

Figure 1:
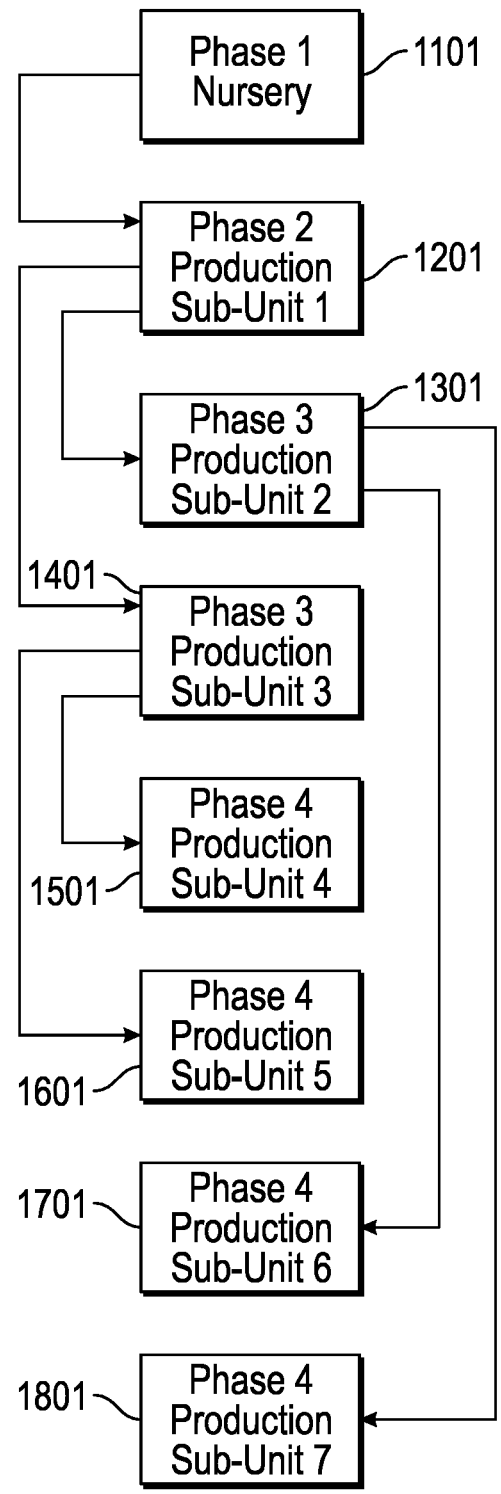
FIG. 1 shows a flow diagram for four phase super-intensive shrimp production model. The Phase 1 Nursery (1101) is in fluid communication with Phase 2 Production Subunit 1 (1201). Phase 2 Production Subunit 1 (1201) is in fluid communication with Phase 3 Production Subunit 2 (1301) and Phase 3 Production Subunit 3 (1401). Phase 3 Production Subunit 2 (1301) is in fluid communication with Phase 4 Production Subunit 6 (1701) and Phase 4 Production Subunit 7 (1801). Phase 3 Production Subunit 3 (1401) is in fluid communication with Phase 4 Production Subunit 4 (1501) and Phase 4 Production Subunit 5 (1601).
Figure 2:
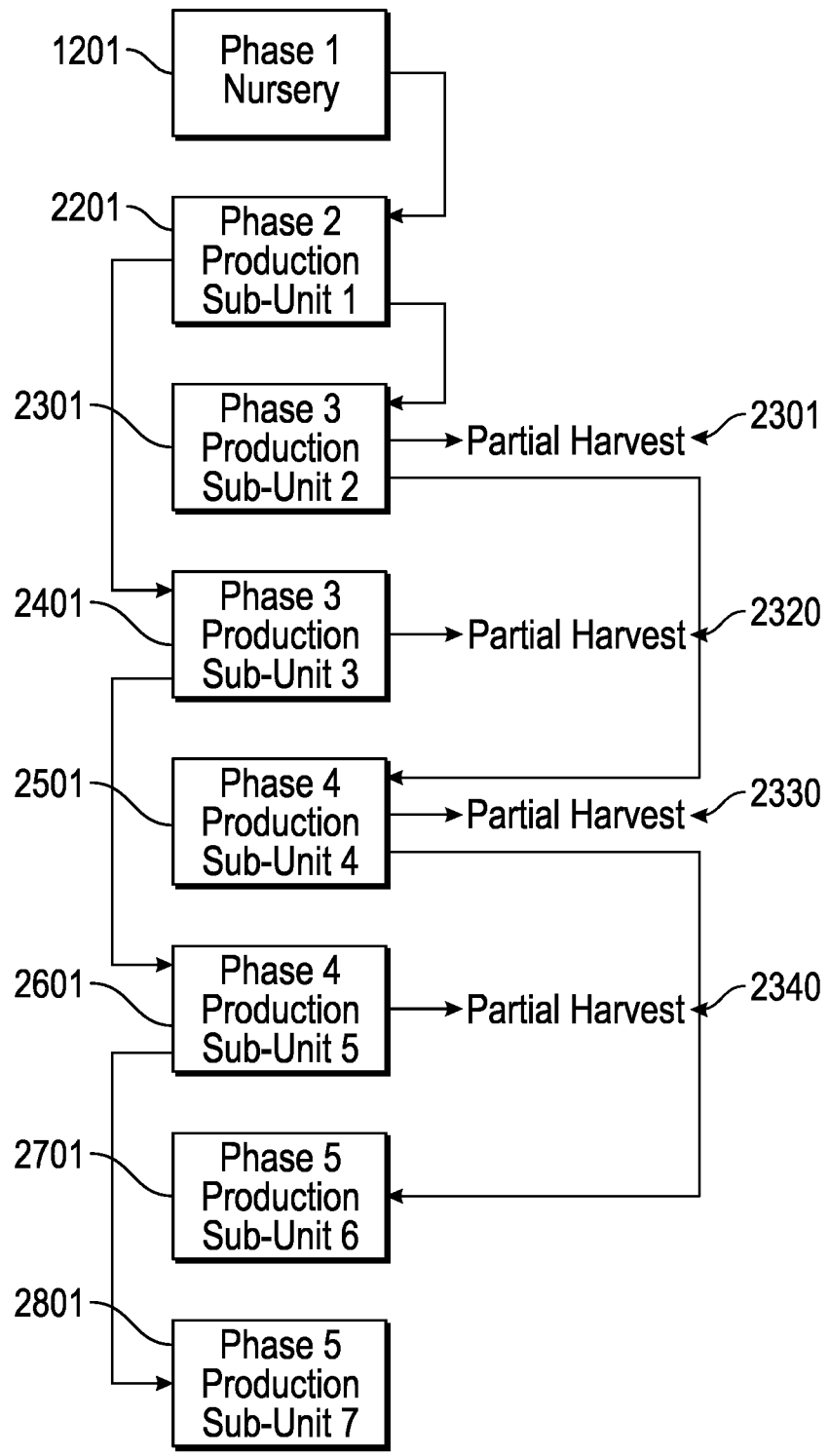
FIG. 2 shows a flow diagram for five-phase super-intensive shrimp production model. The Phase 1 Nursery (2101) is in fluid communication with Phase 2 Production Subunit 1 (2201). Phase 2 Production Subunit 1 (2201) is in fluid communication with Phase 3 Production Subunit 2 (2301) and Phase 3 Production Subunit 3 (2401). Phase 3 Production Subunit 2 (2301) can be subjected to a partial harvest (2310) and is in fluid communication with Phase 4 Production Subunit 4 (2501). Phase 3 Production Subunit 3 (2401) can be subjected to a partial harvest (2320) and is in fluid communication with Phase 4 Production Subunit 5 (2601). Phase 4 Production Subunit 4 (2501) can be subjected to a partial harvest (2330) and is fluid communication with Phase 5 Production subunit 6 (2701). Phase 4 Production Subunit 5 (2601) can be subjected to a partial harvest (2340) and is fluid communication with Phase 5 Production subunit 7 (2801).

A programmable logic controller (PLC) is an industrial computer control system that continuously monitors the state of input devices and makes decisions based upon a custom program to control the state of output devices. Almost any production line, machine function, or process can be greatly enhanced using this type of control system. However, the biggest benefit in using a PLC is the ability to change and replicate the operation or process while collecting and communicating vital information. Preferred PLCs of this invention include 1-12 digital inputs; 1-18 digital outputs; 1-12 analog inputs (0-12 volts); analog outputs, thermocouples; RS232 interface; USB interface. Using a PLC that is commercially available from Velocio Networks Inc (Huntsville, Ala.) a user can use software to have: Process control, Machine control, Motion system control, Automated Test, Home automation. The description of PLC and/or their equivalents are discussed in the data sheets for the ACE, BRANCHED, EMBEDDED products (See Branch PLC, Velocio Networks Inc, Huntsville Ala., pg 1-6, 2014; and Ace PLC, Velocio Networks Inc, Huntsville Ala., pg 1-6, 2014).

Electrical communication as understood in this invention is communication in which any type of information (speech, alphanumeric, visual, data, signals, or other type of information) is transmitted by electric signals propagated over wires or wirelessly (i.e., radio signals, UV, optical, cell phone, and the like). Depending on the means used to transmit or carry the signals, electrical communication may be classified as wire or wireless. Wire communication is often used in many systems in combination with different forms of radio communication, for example, with radio-relay communication and satellite communication. According to the classification of the International Telecommunication Union, electrical communication also includes the transmission of information by optical and other electromagnetic systems.

DETAILED DESCRIPTION OF PREFERRED EMBODIMENTS

Desiring to meet the pressure of driving higher rates of production per unit area along with minimizing costs, a multi-phasic super-intensive shrimp production system comprised of modules conceived along functional lines was devised. The foremost consideration was that each functional module had to be designed such that it could be integrated into the whole. In addition, all modules were designed from the perspective of offsite manufacturing and rapid onsite assembly.

Disclosed herein is an integrated multi-phasic super-intensive shrimp production system that utilizes a first phase shrimp nursery and production units comprised of stacked production sub-units for shrimp grow out, both employing a clear water closed loop Recirculating Aquaculture System (RAS) designed to maximize through put while minimizing production costs. The integrated shrimp production system also includes a computer controlled feed distribution system, a regulated pressure driven aeration system, a custom designed cyber-physical platform for environmental sensing including: water temperature, salinity, dissolved oxygen, turbidity, nitrogen metabolites (ammonia, nitrites, nitrates), acoustic sensors (feeding activity) and real-time visual monitoring of each production sub-unit using CCTV cameras for conditions associated with each production sub-unit (aeration, circulation, feed utilization, harvesting, etc.).

Programmable Logic Controller and User Interface

A programmable logic controller, PLC, or programmable controller is a digital computer used for automation of typically industrial electromechanical processes, such as control of machinery. PLCs are used in many machines, in many industries. PLCs are designed for multiple arrangements of digital and analog inputs and outputs, extended temperature ranges, immunity to electrical noise, and resistance to vibration and impact. Programs to control machine operation are typically stored in battery-backed-up or non-volatile memory. A PLC is an example of a "hard" real-time system since output results must be produced in response to input conditions within a limited time, otherwise unintended operation will result. One having ordinary skill in the art understands that PLC's together with a Human Interface Modules allows human interaction with the machines for the effective operation and control of a machine from the human end, whilst the machine simultaneously feeds back information that aids the operators' decision-making process. The user interface, in the industrial design field of human-machine interaction, is the space where interactions between humans and machines occur. Siemens (Siemens Corporation, Washington, D.C., USA), Allen Bradley-Rockwell (Milwaukee, Wis., USA), Manufacturers include: YSI by Xylem (Pointe-Claire, Quebec, Canada), Pentair Aquatic (Sanford, N.C., USA), Campbell Scientific (Logan, Utah, USA), AQ1 (Hobart, Tasmania, Australia), Ametek (Berwyn, Pa., USA), Hach (Loveland, Colo., USA) and other custom automation systems having PLC's equipment available that would be within the spirit and scope of the invention.

Sensors/Probes:

Monitoring pH. A pH detector is a device used for potentiometrically measuring the pH, which is either the concentration or the activity of hydrogen ions, of an aqueous solution. Other methods and instruments are used for pH determination that can also be utilized for this invention. Paper capable of indicating pH may also be used. Many commercial products are available providing multiple and different means for probes and sensors used for determining the pH, each of which are within the spirit and scope of this invention.

A Water Temperature Sensor/probes: a variety of sensors for measuring water temperature are available. Generally, the electrical signals transmitted from the sensors/detectors can be logged and converted to different units of measurement, including ° C., ° F., and ° K. Many commercial products are available providing multiple and different means for probes and sensors used for determining temperature, each of which are within the spirit and scope of this invention.

A Salinity Sensor easily and precisely measures the total dissolved salt content in an aqueous solution. The Salinity Sensor is capable of measuring water with a wide variety of salinities, from brackish water to ocean water, and even hyper-saline environments. Many commercial products are available providing multiple and different means for probes and sensors used for determining salinity, each of which are within the spirit and scope of this invention.

Dissolved oxygen sensors. The Dissolved Oxygen Probe can be used to perform a wide variety of experiments to determine changes in dissolved oxygen levels, which are one of the indicators of the quality in an aquatic environment. Dissolved oxygen refers to the level of free, non-compound oxygen present in water or other liquids. It is an important parameter in assessing water quality because of its influence on the organisms living within a body of water. Many commercial products are available providing multiple and different means for probes and sensors used for determining dissolved oxygen each of which are within the spirit and scope of this invention. For example, the online catalog of "direct industry" dot COM (directindustry.com) includes a large variety of dissolved oxygen probes. Additionally, Mettler-Toledo Ingold Inc, (Billerica, Mass. 01821 USA) is one of many companies that sells oxygen sensors and probes that serve as useful oxygen sensor for the current invention.

Turbidity sensors. Turbidity is the cloudiness or haziness of a fluid caused by large numbers of individual particles that are generally invisible to the naked eye, similar to smoke in air. The measurement of turbidity is a key test of water quality. Many commercial products are available providing multiple and different means for probes and sensors used for determining turbidity, each of which are within the spirit and scope of this invention. For example, online catalog "direct industry" dot com (directindustry.com) includes a variety of turbidity sensors. Additionally, Mettler-Toledo Ingold Inc, (Billerica, Mass. 01821 USA) is one of many companies that sells turbidity sensors and probes that could be useful turbidity sensors for the current invention.

Nitrogen metabolites (ammonia, nitrites, nitrates) detection. Nitrogen is a critical chemical element in both proteins and nucleic acids, and thus every living organism must metabolize nitrogen to survive. Many commercial products are available providing multiple and different means for probes, sensors and detection used for determining nitrogen metabolites, each of which are within the spirit and scope of this invention.

Acoustic sensors (feeding activity) Surface acoustic wave sensors are a class of microelectromechanical systems (MEMS) which rely on the modulation of surface acoustic waves to sense a physical phenomenon. The sensor transduces an input electrical signal into a mechanical wave which, unlike an electrical signal, can be easily influenced by physical phenomena. The device then transduces this wave back into an electrical signal. Changes in amplitude, phase, frequency, or time-delay between the input and output electrical signals can be used to measure the presence of the desired phenomenon. Many commercial products are available providing multiple and different means for probes and sensors used for determining feeding activity, each of which are within the spirit and scope of this invention.

Cameras. Real-time visual monitoring of each production sub-unit using CCTV cameras for conditions associated with each production sub-unit (aeration, circulation, feed utilization, harvesting, etc.). Many commercial products are available providing multiple and different means for monitoring production visually, each of which are within the spirit and scope of this invention. Infrared CCTV is also a viable option. In preferred embodiments, a Water Proof BW® 700TVL was used (BW Group, China) and a Hikvision DS-2CD2012-I-4 MM 1.3 MP Outdoor Bullet IP Camera—(Hikivision, City of Industry, Calif., USA).

Sound Feeding System. An SF200 sensor-based feeding control system for shrimp farmers was used with the current invention. The system uses passive acoustics to identify shrimp feeding activity and then uses that information to control temporal feed delivery via an adaptive feeding algorithm. The adaptive algorithm ensures feed delivered matches shrimp appetite so that all animals are fed fully without waste 24 hours a day if required. Other feeding systems that are not as elaborate are also considered to be within the spirit and scope of the invention.

Nursery Module

Post-larvae (PL) numbers required to meet production levels laid out in Table 1 above are high. Therefore, demands placed on a nursery phase executed separate from grow out phases are high. To meet this requirement, a high-capacity nursery module had to be devised.

Disclosed herein shrimp PLs are stocked into tanks stacked vertically in an intermodal container, at a density of 4,000-8,000/$m^2$. Each tank contains water of the same salinity as that used in pre-equilibration of the PLS. The water in each tank is maintained by circulating it through a recirculating aquaculture system (RAS) similar to that described below for Production Modules (see RAS Module). Water is continuously aerated and maintained at 31-33° C.

Figure 3A:
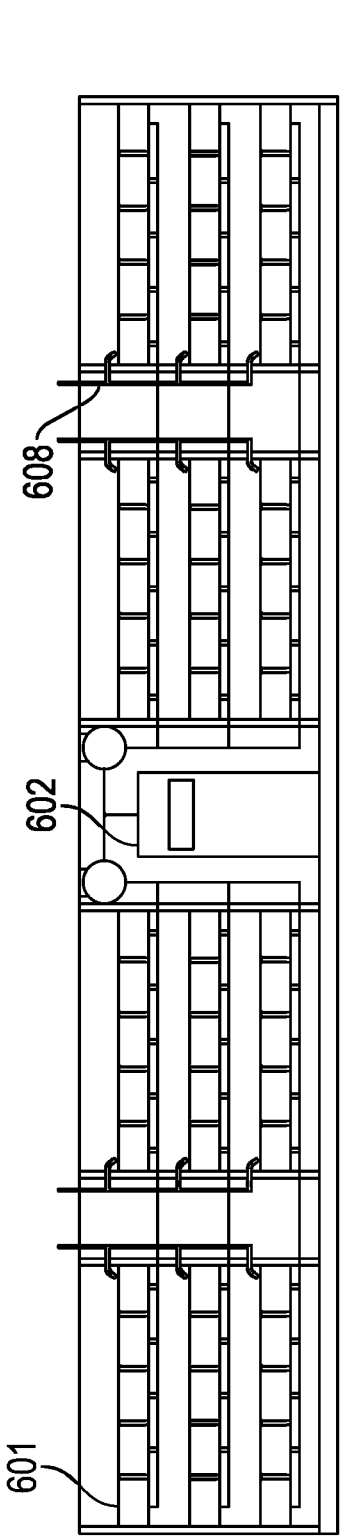
FIG. 3A illustrates a partial see through side view of an intermodal container showing stacked nursery tanks used for culture of shrimp post-larvae and location of support equipment.

According to one embodiment of the disclosure PLs may be stocked into stacked shallow water tanks, FIGS. 3A, D and E (601), stacked vertically in an intermodal container, at a density of 5000-12.000/$m^2$. Tanks can be fabricated from many different materials including fiberglass, wood composites, synthetic plastics, (such as polyethylene, propylene, acrylonitrile butadiene, styrene, etc.), epoxy coated steel, metals, and combination thereof. In one desired consideration tanks are fabricated from acrylonitrile butadiene styrene (ABS) with a 0.5-1.5% slope to a front corner wherein a standpipe is situated. Prior to installation of the tanks all surfaces on the interior of the intermodal container are completely sealed with a chemical resistant material, example epoxy, to prevent saltwater corrosion.

The saltwater depth in each tank 601 (FIGS. 3A, D and E) is maintained at an average depth of 30-50 cm, preferably 40 cm. Tank water depth in each tank is independently maintained using a standpipe plumbed through the wall of the intermodal container into the equipment compartment (602) in which, PLS are stocked. During the PL culture a diverter valve and pump will maintain water levels by circulation from storage tanks (606).

Heating and/or cooling equipment is centrally located in the equipment compartment built into each intermodal container 602 (FIG. 3A). The temperature in each tank is maintained by circulating fluid medium maintained at 31-33° C. through a hydronic system consisting of polyethylene (PEX) tubing fastened to the bottom of each nursery tank. This circulation is totally independent of the tank contents.

For aeration purposes, air is pre-conditioned to 31-33° C. using a heat exchanger located in equipment compartment 602 (FIG. 3A) then dispersed into the water in the PL tanks 601 (FIGS. 3A, D and E).

Figure 3B:
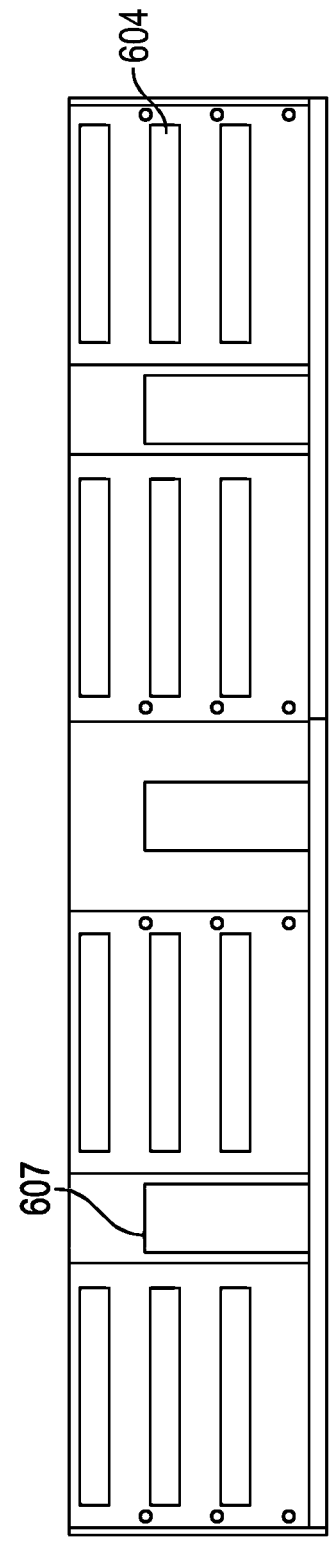
FIG. 3B illustrates an exterior side view of an intermodal container showing location of access panels and doors used for service access.

A computer-controlled actuator controls feed distribution that is flushed into the tank(s) through tubes 608 (FIG. 3A) connected to a hopper located between tank stacks located in door accessible compartments to the left and right of the equipment compartment 607 (FIG. 3B). Of note are panels cut into the left and right side of the front and opposite side from the front (backside) of an intermodal container 604 (FIG. 3B) These panels allow access to each nursery tank since they are located above the edge of each tank. They are there for the purpose of screen placement in each tank that increases surface area and act as baffles in the tanks. In addition, after each cycle the tanks need to be cleaned and the panel cut outs allow ready access. Each panel cut out under operating conditions is sealed by a gasket around the door. The door is locked when not needed for access.

Figure 3C:
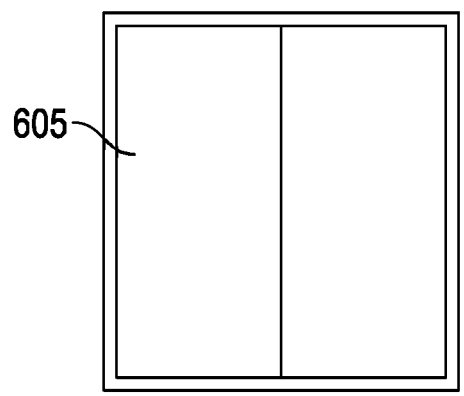
FIG. 3C illustrates the end-view an intermodal container with the doors shown.
Figure 3D:
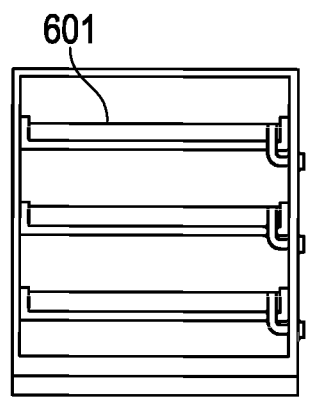
FIG. 3D shows a cross-section through stacked nursery tanks constructed in an intermodal container, viewed from an end perspective.
Figure 3E:
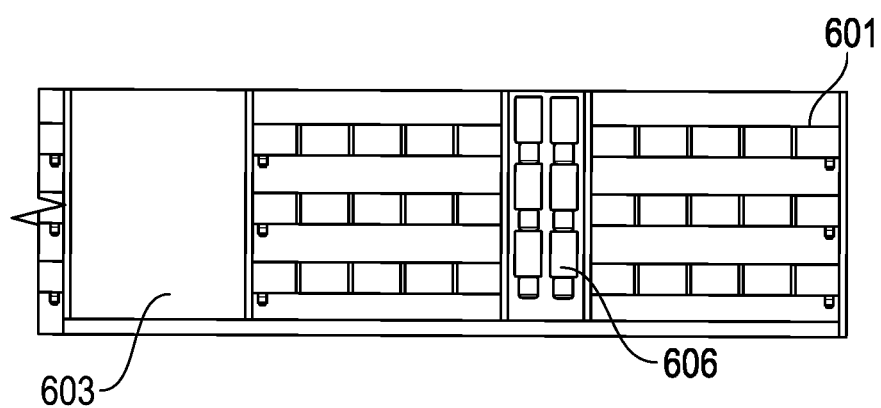
FIG. 3E illustrates an enlargement of the right half of FIG. 3A allowing for increased detail.

The panel shown in 603 (FIG. 3E) is a cover for the equipment compartment. Similarly, 605 (FIG. 3C) show the doors located at each end of the intermodal container.

The nursery phase can be carried out for 25-40 days, preferentially 30 days. At the end of this period, PLs have developed into 0.4-0.7 g juvenile shrimp. The timing can be varied somewhat. Circumstances may be such that it is desirable to accelerate or slow down shrimp growth, this can in part be established by adjusting the water temperature and or feed rate up or down.

At the end of the nursery phase the juvenile shrimp can be quantified and transferred to a production module for grow out.

Grow Out Production Module

A defining limitation when considering shrimp production in a warehouse is the water footprint, i.e., the area occupied by water at ground level. The multi-phasic system disclosed herein allows for production of significantly >100 kg/$m^2$ of water footprint per year (see Table 1 above) an amount significantly greater than any other system. It is more than ten times the quantity that can be grown per $m^2$ in single phase production systems, such as in ground raceways or above ground tanks.

Cultivation of shrimp in land-based tanks or ground situated raceways, typically requires an average water depth of approximately one meter making the weight prohibitive for application in stacked systems. However, as disclosed in U.S. Pat. No. 8,336,488, shrimp can be cultivated at average water depths as low as 10 cm, making it possible to stack production sub-units and thereby allowing for increased shrimp production per water footprint, i.e., the area of occupied ground level.

Figure 4:
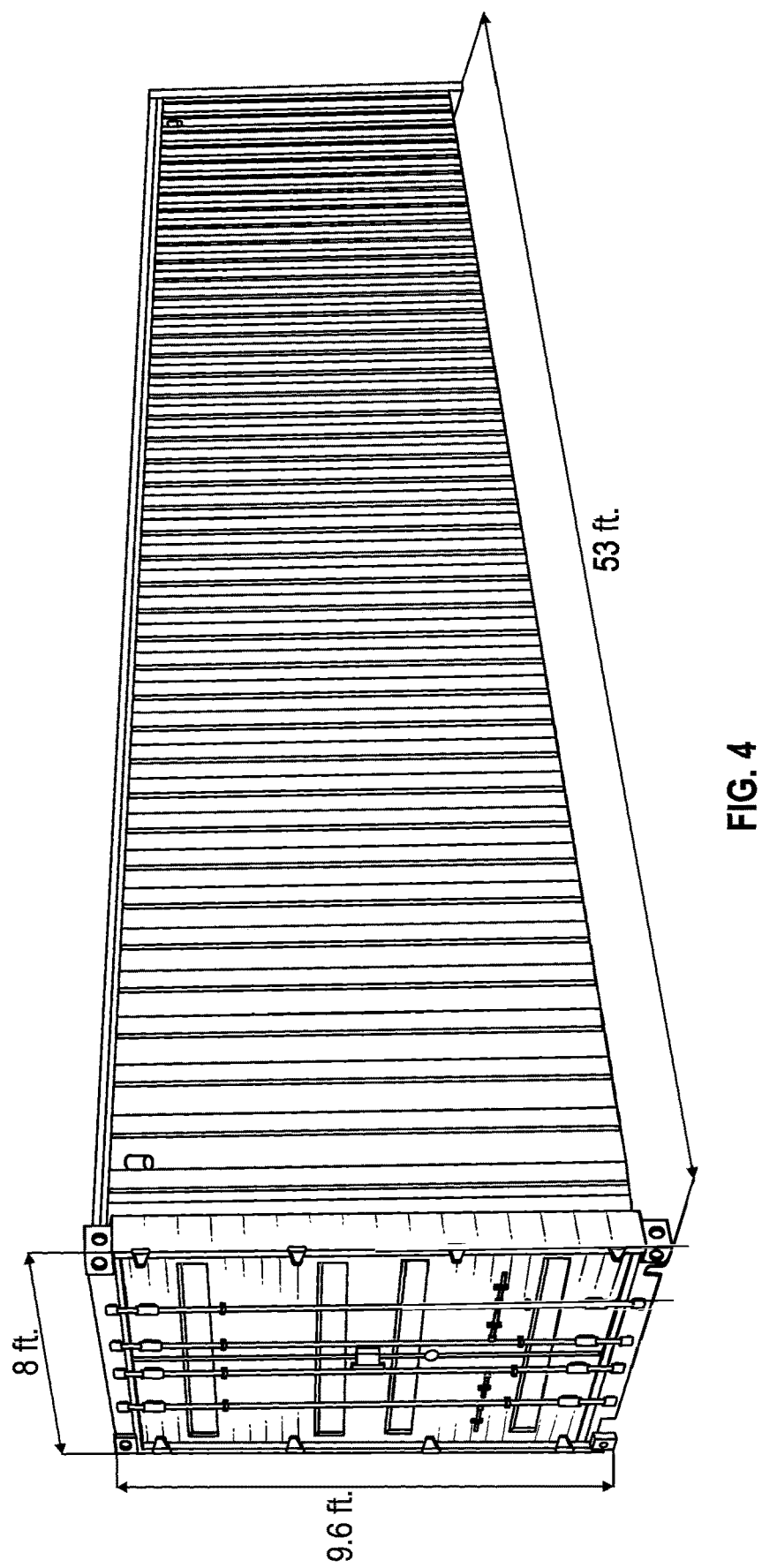
FIG. 4 shows a preferred intermodal container with exterior dimensions indicated.

According to a more specific embodiment disclosed herein is a design for a super-intensive multi-phasic shrimp production module that utilizes specialized production sub-units integrated into two stacked "Hi-cube" (HC) intermodal container units. HC intermodal container units typically have doors fitted at each end and are constructed of corrugated weathering steel (FIG. 4). Each HC can be stacked and have castings with openings for twist lock fasteners located at each corner. For purposes disclosed herein each unit typically has a height of 9 feet 6 inches (2.896 m) and a length of 53 ft. (16.15 m). When stacked the height of two intermodal container containers is 19 ft. (5.79 m).

Figure 5:
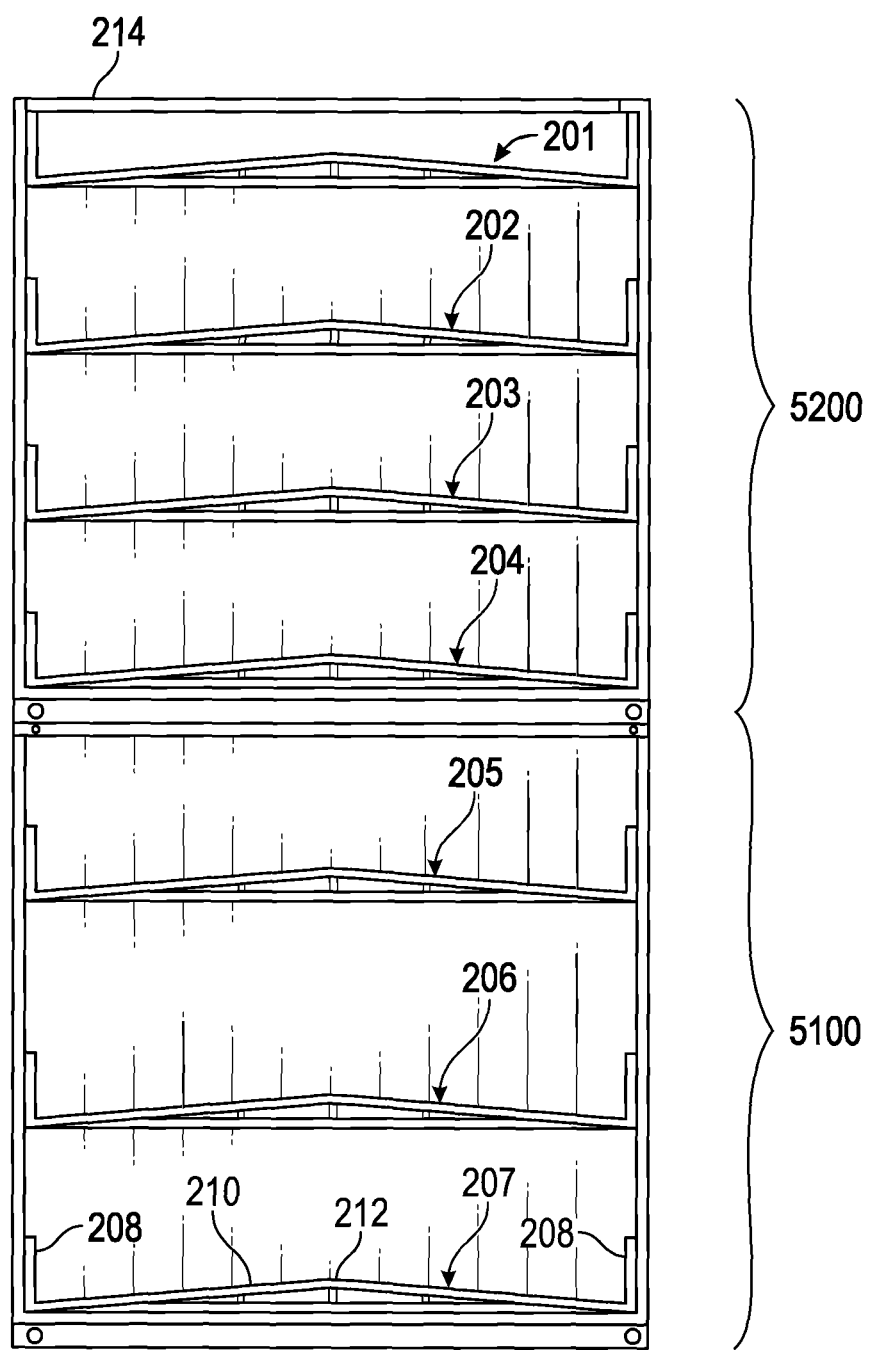
FIG. 5 illustrates a schematic of a cross-section of two intermodal containers stacked and the production sub-units vertically arranged within.

According to another embodiment of the disclosure, shrimp may be grown in series of stacked production sub-units fabricated in intermodal containers. Accommodated within each production sub-unit is water of low average depth for growing shrimp. One such design is presented in FIG. 5 showing a second intermodal container (5200) stacked on top of a first intermodal container (5100). A cross-section through two intermodal containers in which the production sub-units vertically arranged within is shown in FIG. 5. Production sub-units 201, 202, 203 and 204 are integrated into the upper intermodal container 214, with 205, 206 and 207 situated in the lower intermodal container. The number of production sub-units per intermodal container can be reconfigured without limitation. Also illustrated in FIG. 5 is the configuration of production sub-unit sub-frame. Shown is the wall 208, base and a raised center-point 212.

The intermodal container structures have structural rigidity, have four self-supporting walls and are linear such as to form a rectangular box. Structural rigidity is conferred by a steel frame and welded steel walls of corrugated steel.

Structural rigidity is of paramount importance because the base intermodal container must support one or more identical size structures placed directly on top. In addition, each intermodal container should be able to retain structural integrity when the production sub-units 201-207 are filled with water and weight is transferred to the intermodal container walls and downward to corner supports. There cannot be any dimensional change, along the x, y or z axis or it will result in elevation differences that will cause water depth changes in the production sub-units and shrimp production issues.

Figure 6:
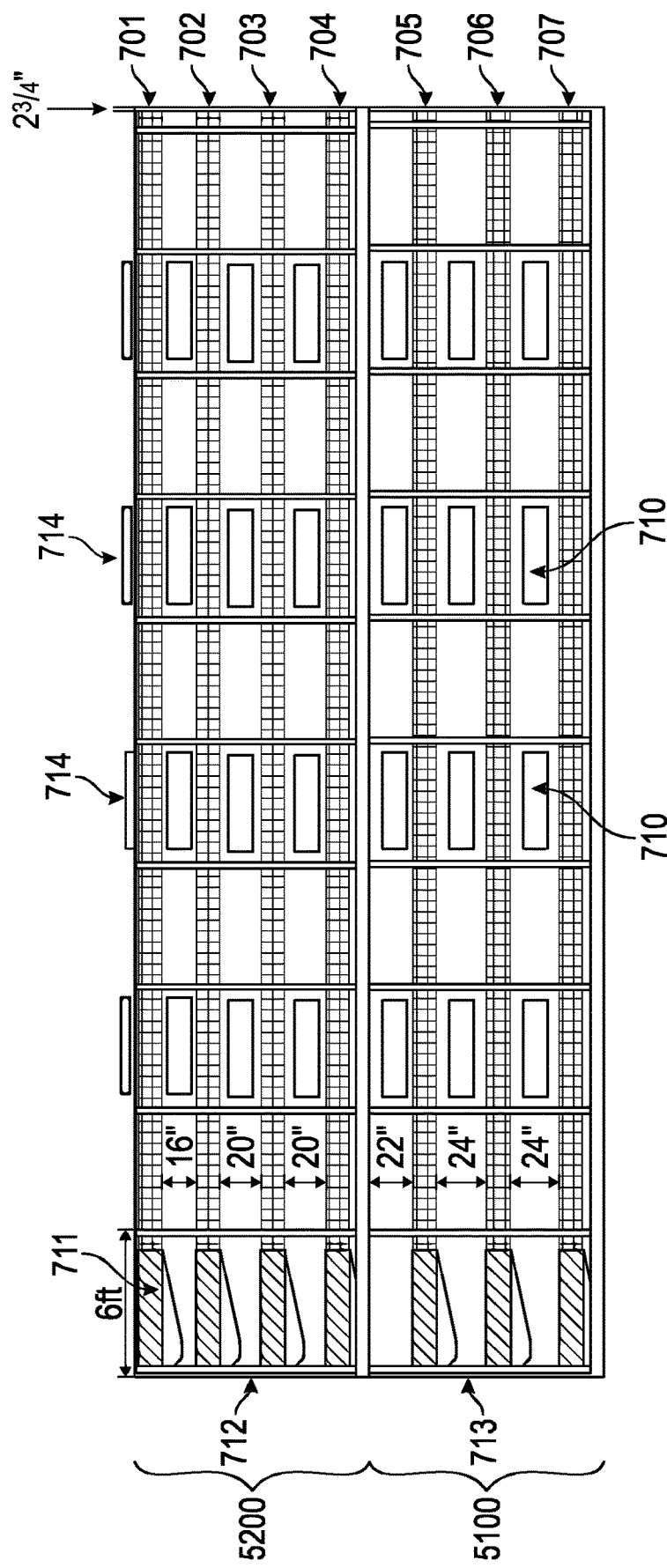
FIG. 6 illustrates a partial see through side view of an intermodal container showing production sub-units arranged vertically in two stacked intermodal containers. The harvest pit is shown at the left side along with access doors arrayed above the water level of each production sub-unit.

Configuration of a production module is illustrated further in FIG. 6. Shown in FIG. 6 is a schematic of a partial see through side view of two stacked intermodal containers (712, 713) in which production sub-units arranged vertically in each (701, 702, 703, 704, 705, 706, 707). A harvest pit 711 is shown as being located at the left end of each production sub-unit. Also illustrated are access door panels 710 and 714 installed just above the water level of production sub-units 702, 703, 704, 705, 706 and 707. These doors have gaskets and a locking arrangement such that they completely form a tight seal when closed. The doors are purposely situated to allow monitoring of shrimp and conditions associated with production sub-units, e.g., feed distribution, water circulation, aeration, etc. There is limited vertical space between the production sub-units 701 and the roof of 712. As noted previously, the number of production sub-units per intermodal container is flexible and can be varied. Otherwise, all production sub-units are identical in design.

Figure 7A:
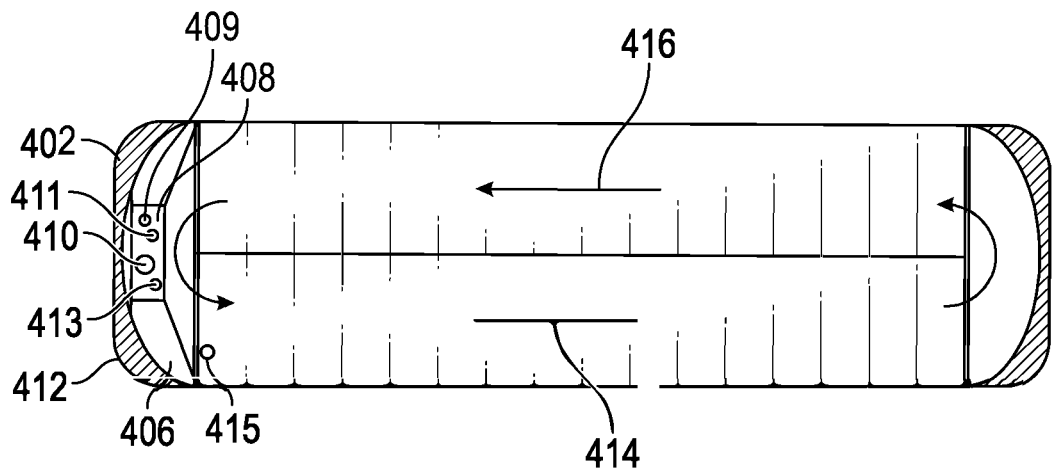
FIG. 7A illustrates a production sub-unit viewed from above. Also illustrated is the directional flow of water within.

All production sub-units have the same design and are fabricated externally as a unit, before being inserted into an intermodal container. There is no elevation difference along the length of each raceway. Water depth in each production sub-unit is set at an average depth of 35 or more cm. One such production sub-unit configuration is shown in FIG. 7A. Each production sub-unit is ~2.4 meters wide by 15.5 meters long. A structure for inclusive purposes termed a pit 412 (FIGS. 7A, B and C) is constructed at one end and an end cap structure constructed at the opposite end (FIG. 7A). It is designed to facilitate water recirculation.

A description of the production sub-unit module in FIG. 7A comprises a rectangular cuboid tank having a raised lengthwise depth-line that is shallower in middle of the tank (see cross section FIGS. 8A and 8B) with a pit structure (FIGS. 7B and 7C) located at the first end of the tank and cap structure located at the second end of the tank. The rectangular cuboid tank is capable of holding fresh or salt water. The re-circulating aquatic system is in fluid communication with the production sub-unit module. Additionally, the feed distribution module is in fluid communication with the production sub-unit module. The computer control module is interfaced with one or more equipment modules connected to the production sub-unit module, the re-circulating aquaculture system module and/or the feed distribution module.

Figure 7B:
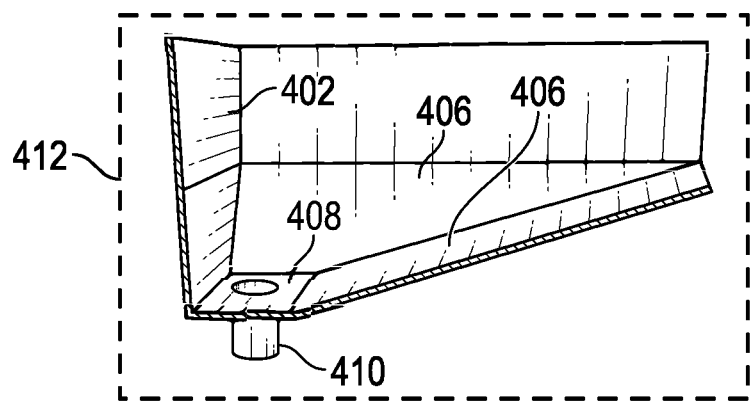
FIG. 7B illustrates a cross-section along the linear axis of the harvest pit located at the left end of FIG. 7A.
Figure 7C:
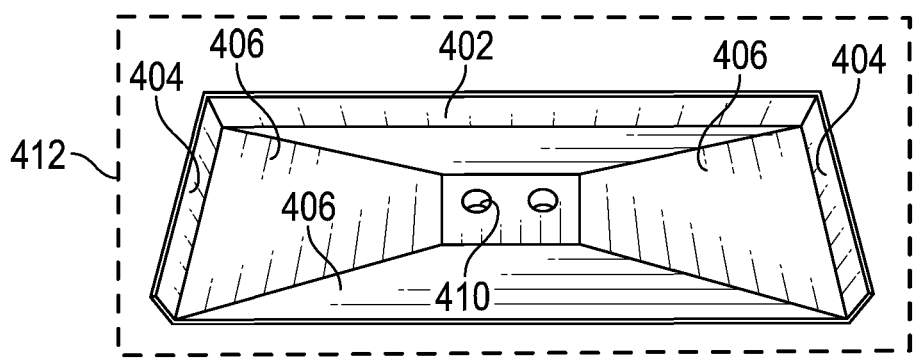
FIG. 7C illustrates a detailed view of the harvest pit along the production sub-unit axis to the left of FIG. 7A.

According to a more specific embodiment the pit comprised of multiple sub-structures 406, 408 (FIGS. 7B and C) is 25 to 35 cm in depth as measured from the bottom 402 of FIG. 7B and 402 404 of FIG. 7C to the base 408. The pit length 404 (FIG. 7C) is 1.2 meters long. The side walls 402 and 404 (FIGS. 7A, B and C) that extend all around the production sub-unit are 40 cm in height. The side walls of the pit are contiguous with the walls of the rest of the production sub-unit. When the container doors are closed, each production sub-unit forms an isolated enclosed compartment relative to those positioned above and below. The end sidewalls 412 and 417 are angled outward 5-15 degrees at the corners to facilitate water circulation and eliminate blind spot detritus accumulation.

Figure 9:
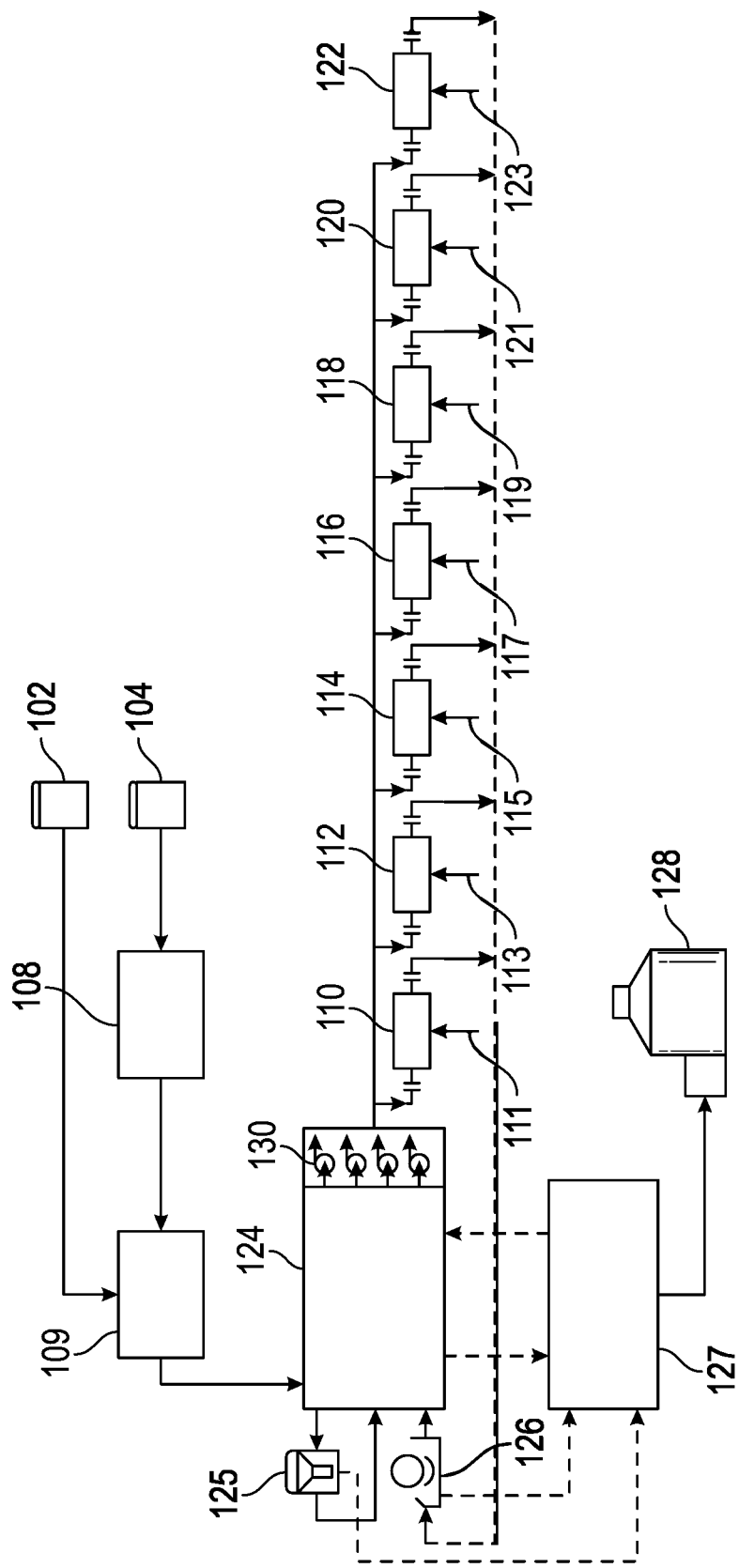
FIG. 9 illustrates a detailed flow diagram of the recycling aquaculture system (RAS) designed as a module to be operated as part of the integrated multi-phasic production system.

The pit structure 412 (FIGS. 7A, B and C) has many functions necessary for a multi-phasic integrated super-intensive production system to work. From a functional perspective, four physical openings were designed into the bottom of the pit 409, 410, 411 and 413 (FIG. 7A). Water that is circulated in a counterclockwise direction by directional nozzles (see below), when passing over and interacting with water in the pit 412 will slow down. Waste present in the water will sediment out, accumulating on the bottom 408 (FIG. 7B). For removal purposes, detritus including shrimp fecal material is gently suspended by sending water through a capped directional nozzle 409 (FIG. 7A) and captured by screen capped outlets 411 and 413. The screened outlets 411 413 are permeable to waste. Screens are sized as to retain shrimp. Water and detritus passing through the screen caps is pumped to the Recycling Aquaculture System (RAS), See RAS Module below (FIG. 9). Also located within the pit, i.e., at the bottom, is an outlet 410 (FIGS. 7A and C). This outlet is used for shrimp transfer and harvesting. For the purposes described, a large diameter flex-tube can be connected to 410 and when a gate valve is opened, water along with shrimp will pass through the opening. Water and shrimp can thereby be diverted to a lower tier production sub-unit or sent to harvest tank. In either case it is often desirable to quantitate the number of shrimp being transferred or harvested. This can be accomplished by attaching a flex tube to a Larcos Shrimp Counter (Flanery, W., Kramer, K., Steimle, E., and Kristjansson, H., "Brief Description of the Larcose Shrimp Counter," VAKI Aquaculture Systems Ltd., Web, 21 Feb. 2013) and allowing the shrimp suspended in water to pass through a photo-electric sensor connected to a computer, wherein computer imaging software is used to process the image and count the number of shrimp. For example, a Larcose shrimp counter is a video-based counting system that uses computer-imaging-recognition to count post larvae. It can recognize any object from about 3 mm to 200 mm. It can count post larvae as small as PL-5's, even differentiates the live ones from the dead ones. Using a flow through counting system does away with nets, water chilling and statistical guesswork.

In the case of partial transfer, real time counting allows operator to quantitate and disperse shrimp into production sub-units as desired. It does away with nets and/or statistical guesswork. Use of the counter also has application if the shrimp are to be offered for sale as live shrimp, i.e., it allows an operator to enumerate the number of shrimp consigned to a client at the point of sale.

Water level in a production sub-unit is maintained by a standpipe and a depth sensor. On demand water depth is restored by water pumped into each production sub-unit from a storage tank that is part of RAS. Water circulation around the production sub-unit is driven by recycled water pumped into the production sub-unit from RAS and air dispersion nozzles located around the side walls of the linear lengths of the production sub-units.

Disclosed in FIGS. 7A, B and C is the overall design of the production sub-unit. For fabrication purposes a wire frame sub-structure comprised of heavy gauge stainless steel wire mesh is constructed. It is shaped to form the base 804 (FIG. 8A) and sidewalls 802 (FIGS. 8A and B) of the production sub-unit. To complete construction of the production sub-unit a 100-mil high density polyethylene (HDPE) liner is fitted over the sub-frame and where required joints are heat welded to form a watertight compartment.

The sub-structure and liner that constitute a production sub-unit are supported at linear intervals by cross braces 803 (FIG. 8B). Cutouts in the cross-braces 805 (FIG. 8A) are situated to facilitate plumbing and wiring installation necessary for operation. Example, when transferring or harvesting shrimp, high water pressure lines routed through the cross-brace cutouts 805 605 that are to computer-controlled actuator valves can be activated. Water in a successive pulse sequence starting from the recirculation end cap moving towards the harvest pit 412 (FIG. 7A) can be used to clear any shrimp from the production sub-units. This is a necessary step because although they may be flushed out of the production sub-unit with evacuated water, a certain percentage are predisposed to become stranded in an attempt to counter the water flow.

The production sub-unit bed 804 is fabricated such that it is flat 30 cm laterally from the sidewall 802 (FIG. 8A), then pitches upward to the center and down to the opposing sidewall. Thus, it forms an arch like structure having a center elevation ~20 cm directly above the center point of the support brace 803 (FIG. 8B). From a functional perspective, the elevated center aids in water circulation along the linear axis of the production sub-unit as well as aeration and detritus removal, formation of increased surface area and facilitates harvesting of shrimp by creating a deep-water drainage channel on either side of the production sub-unit.

Also shown in FIGS. 8A and B, are brackets 801 located at the end of each support brace 803 (FIG. 8B). When the production sub-unit is installed in the intermodal container, the brackets are welded to walls and are the means of support for the fully assembled production sub-unit.

Each production sub-unit in the production module is independently connected to a closed loop water recycling aquaculture system (RAS) module A flow diagram of the RAS module is shown in FIG. 9. RAS processed water before being cycled back to individual production sub-units is heated to (31-33° C.) using a heat exchanger. Likewise, compressed air is pre-conditioned prior to being injected through connection ports inside of the production module (intermodal container wall) and the side walls of the production sub-units. The amount of air injected through diffusers will be controlled by flow valves and pressure regulators that can be computer controlled.

Aeration is a critical requisite in shrimp aquaculture. Ambient air may vary significantly through the day outside the production module. Cold air when used for aeration can dramatically decrease water temperature, reduce shrimp metabolism, i.e., shrimp growth, and drive up the energy costs of production. Therefore, tempered compressed air will be used to oxygenate the water in each production sub-unit.

Additional monitoring features are embodied in the design of the production module. When in operation everything inside the production module is isolated from the ambient outside environment. Therefore, a method had to be devised to monitor activities within the tunnel like space above production sub-units installed within the intermodal container during grow out. This being the objective, LEDs are located on the walls above the water line of each production sub-unit and a Charge Coupled TV (CCTV) camera is strategically placed above each production sub-unit. The signal from each CCTV camera is fed back to a central workstation where it can be monitored. Illumination during grow-out is kept at a low intensity. It is raised infrequently to a level sufficient for the purpose of checking to determine if there are issues with circulation, feed disbursement and consumption or the shrimp themselves.

A cyber-physical system ("CPS") is a system of collaborating computational elements controlling physical entities. Unlike more traditional embedded systems, a full-fledged CPS is typically designed as a network of interacting elements with physical input and output instead of as stand-alone devices. The notion is closely tied to concepts of robotics and sensor networks with intelligence mechanisms proper of computational intelligence leading the pathway. Ongoing advances in science and engineering will improve the link between computational and physical elements by means of intelligent mechanisms, dramatically increasing the adaptability, autonomy, efficiency, functionality, reliability, safety, and usability of cyber-physical systems that is within the spirit and scope of the invention disclosed within. For example, other monitoring equipment included water quality sensors embedded in each production sub-unit. Data from the sensors connected via a cyber-physical platform will be feedback in real time to a central computer. Physical and chemical measurements to be monitored include: water temperature, salinity, dissolved oxygen, pH, total dissolved solid (TDS), nitrogen metabolite levels (ammonia, nitrites, nitrates) as well as acoustics (feeding activity).

Re-Circulating Aquaculture System (Ras) Module

According to a specific embodiment described herein stacked production sub-units within the shrimp grow-out production module should be operated using closed loop RAS. Illustrated in FIG. 9 is a RAS designed to operate in conjunction with the integrated multi-phasic shrimp production system. Briefly, as shown in FIG. 9, influent filtered natural seawater 102 or well water 104 is combined with sea salt 108 to a desired salinity before being placed into a storage reservoir 109. The salt water is then distributed to the production sub-units 110, 112, 114, 116, 118, 120 and 122 constructed in a production module by pumps. Water pumped directly to each production sub-unit is not aerated. This water is provided separately to each production sub-unit 111, 113, 115, 117, 119, 121 and 123.

Closing the loop, water from each production sub-unit 110, 112, 114, 116, 118, 120 and 122, in which shrimp are grown is removed at a controlled rate and sent to a Micro-screen Drum Filter 126 to remove detritus (excess feed, feces, etc.) before being pumped to Moving Bed Bio-Reactor (MBBR) 124 for reprocessing to remove suspended waste, in particular ammonia. The water pumped to the MBBR 124 is cascaded downward through a cross jet of natural air to remove carbon dioxide. It then passes over a micro-bead media to denitrify the water. Ammonia is converted to nitrate by bacteria attached to the media. Water from the MBBR 124 is cycled through a foam fractionator 125 to remove emulsified proteinaceous materials and returned to the MBBR. Water tempered is then returned to each production sub-unit (110, 112, 114, 116, 118, 120 and 122) by pumps 130. Water saturated waste from 124 and 125 is diverted to 127 an Up-flow Anaerobic Sludge Blanket Reactor 127 for processing. Sludge from 127 is removed as needed and used as high nitrogen fertilizer or sent to a landfill. Water is placed in storage 128 for recycling back into the operation.

Feed Distribution Module

Shrimp will consume feed 24/7, thus a system to accomplish this was devised in order to maximize shrimp production. There are several problems associated with non-floating shrimp feed. For example, feed spread across the water surface or by injection at a single point is rapidly hydrated on contact. The water quickly leaches away nutrients and/or chemotractants. Thus, not only is the non-floating shrimp feed less nutritious, over time the shrimp cannot even detect it. Feed becomes nutritive source for bacteria resulting elevated ammonia production. It is also difficult to judge whether the shrimp have eaten all of such feed because it cannot be seen through the water. As a result, shrimp may easily be fed too much feed, leading to waste and water pollution, or too little feed, resulting in less rapid growth. Non-optimal feeding may also occur because non-floating shrimp feed should be spread over the surface of the water by the feeding system; otherwise, it will simply sink in one area and not provide feed equally to shrimp in all areas. While access to a production module is provided by access panels inserted above the production sub-units (see FIG. 6), it is inconceivable that panels could be opened on a routine basis multiple times per day to distribute feed and/or mechanical system could accomplish this without driving the cost up very substantially. Overall, new systems and methods of shrimp aquaculture are needed to address one or more of the above problems as well as other difficulties.

For purposes of the embodiment described herein a floating feed was selected. Floating feed prepared by a preconditioning and extrusion cooking process that pasteurizes the product is preferred, as this technology lends itself to making small diameter feeds that are stable. As described in United States Patent Application Publication US 2012/0204801, use of a floating feed facilitates: feeding shrimp using a mechanical point feeding system, feeding shrimp whenever needed 24 hours a day, decreasing water pollution and waste due to unconsumed feed, optimizing feed rate by observing when feed has been consumed, increasing shrimp growth rate, decreasing shrimp death rate, improving overall shrimp health, decreasing nutrient leaching from the feed, decreasing feed loss with the discharge (removal of water) from the production system, and reducing the amount of feed required to produce a pound of shrimp, i.e., reducing the FCR (Feed Conversion Ratio).

A multi-phasic shrimp production system presents a unique problem, i.e., a one size feed does not fit all. Small shrimp at Phase 2 of grow out (see Table 1) are not able to efficiently consume feed pellets that are suitable for shrimp at Phase 4 of grow-out (see Table 1). Therefore, a system was devised that could provide size appropriate feed on a real-time basis to each production sub-unit wherein shrimp ranging in size from 0.7-30 plus grams may be present.

In addition to feed considerations, environmental factors have to be addressed when designing a feed distribution system. The environment within the grow out production module as a whole, but more importantly in the volume occupied by each production sub-unit, is highly water saturated. Feed pellets, including floating feed pellets will agglomerate to wall of any tube through which feed is introduced by gravity and/or through an air driven distribution system. Therefore, a feed distribution system modified from that of a system originally designed by Environmental Technologies Inc. was integrated into the multi-phasic production system disclosed herein to deal with associated issues.

Figure 10:
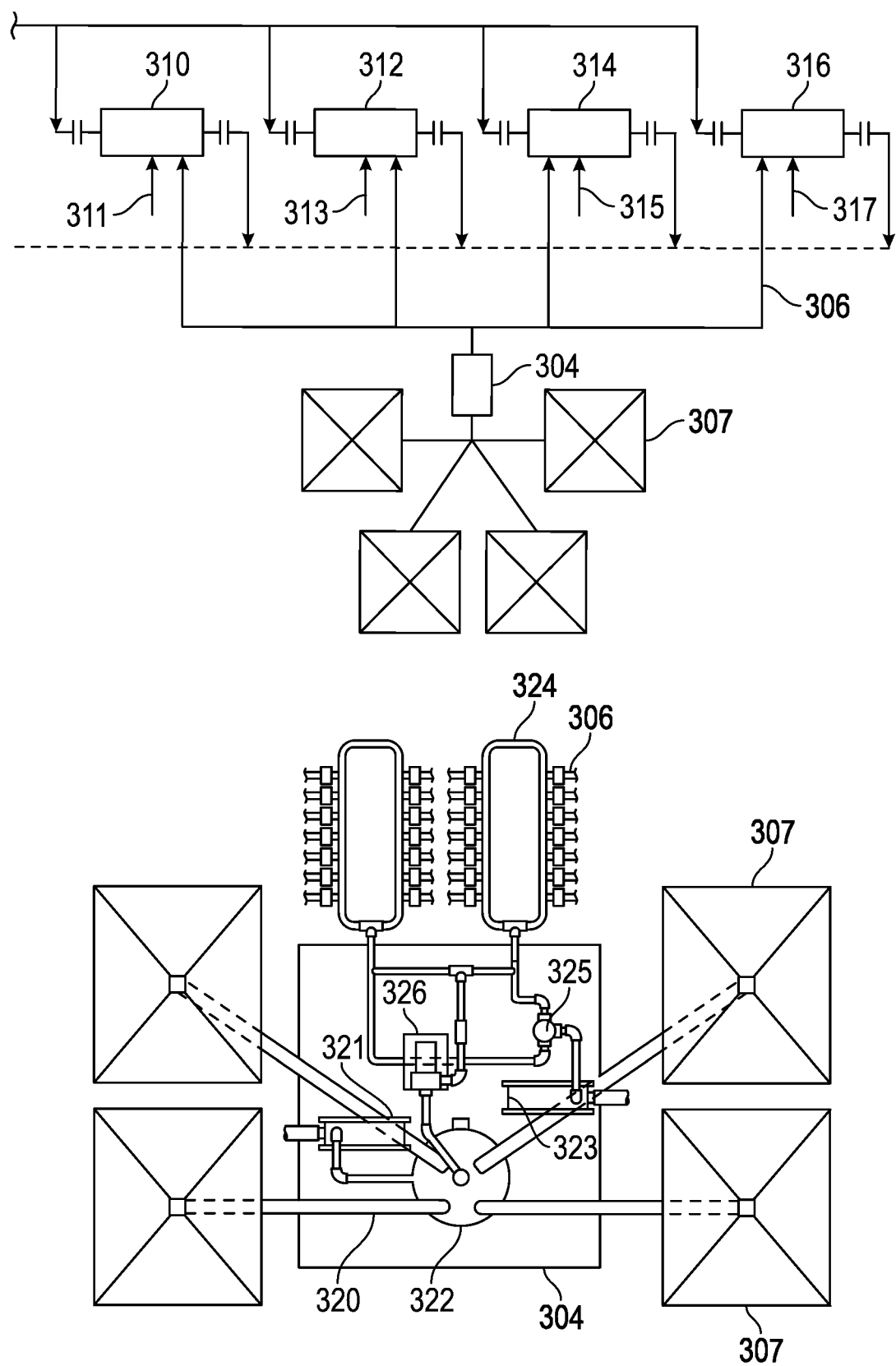
FIG. 10 shows a detailed schematic of a computer-controlled feed distribution system designed to distribute size appropriate feed to production sub-units.

To address issues described above, an on-demand feed distribution system was devised to distribute four different size feeds. In addition, environmental factors were eliminated by hydrating the feed and pumping it directly to each production sub-unit through feed-tubes. The distribution system is shown in FIG. 10. The system is designed around the objective of selectively dispensing four different sized feeds from storage hoppers to production sub-units 310, 312, 314 and 316. Switching sources is by computer-controlled actuators.

Briefly, selected feed is augured by computer-controlled drives from feed silos 307 (FIG. 10) via a screw auger 320 to a hydration tank 322. In rapid succession water is pumped 321 into the hydration tank 322 and the suspended feed is immediately pumped 326 to a manifold 324. The suspended feed now present in the manifold 324 is then distributed by pumps to the desired production sub-unit, i.e., 310, 312, 314, or 316, through water charged distribution tubes 306 when computer-controlled actuator valves at the manifold 324 are opened. After discharge, pressurized water from 323 is flushed through an actuator control valve 325 into the manifold 324 and then through the distribution tubes 306 to purge any residuals in system before next feeding cycle is activated. Flushing will prevent feed accumulation, leaching of the feed, etc. Each feeding tube is ported through the wall of each container into a feeding point above the water level of each production sub-unit allowing for single-point feeding. Along with the feed distribution system, aerators for production sub-units 311, 313, 315 and 317 are indicated (FIG. 10).

EXAMPLE 1

A preferred modularized shrimp production system comprises several units including:
a. a post-larvae nursery module;
b. a production sub-unit module;
c. a re-circulating aquaculture system (RAS) module;
d. a feed distribution module; and
e. a computer control module.

The basic operations of the system are modularized and integrated to form a multi-phasic synchronous super-intensive shrimp production system controlled by a custom designed cyber-physical platform that acquires data through sensors embedded in post-larvae nursery module, production sub-unit module, re-circulating aquaculture system (RAS) module, and feed distribution module that allows regulation of all aspects by Program Logic Controllers (PLCs) integrated with Human Interface Modules (HIMs) through coupled feed-back loops for maintaining an aquaculture environment for a synchronous production cycle of shrimp. The preferred post-larvae nursery module includes at least one shallow water tank for producing juvenile shrimp. The post-larvae nursery module is in fluid connection with the post-larvae re-circulating water system ("PL-RAS") module, the feed distribution module, and the computer control module. The post-larvae nursery module has all equipment to be a stand-alone unit, but some aspects can be integrated into the entire productions system. The production sub-unit module comprises at least one rectangular-cuboid-tank having a raised lengthwise depth-line that is shallower in middle of the tank with a harvest pit structure located at one end of the tank and a cap structure located at another end of the tank. This rectangular cuboid tank is capable of holding water and fitted with at least one valve for introducing and evacuating water. The re-circulating aquatic system (RAS) is in fluid communication with the production sub-unit module. The feed distribution module is in fluid communication with the production sub-unit module. The computer control module is in electrical communication with human interface modules ("HIMs"). In a preferred embodiment, one or more equipment devices that are linked to the post-larvae nursery module, the production sub-unit module, the re-circulating aquaculture system module, or the feed distribution module.

The post-larvae nursery module comprise one or more shallow water tanks having the dimensions of about 8 ft by about 8 ft by about 1.5 ft that are sloped at an angle of about 0.5-1.5% toward a standpipe situated in a corner of the tank. The water depth in shallow water tank is maintained at an average depth in the range of 30-50 cm, and preferably about 40 cm. The dimensions of the preferred production sub-unit module comprises one or more rectangular-cuboid-tank having the dimensions of about 7.9 ft by about 52 ft by about 1.55 ft including the harvest pit at one end and a recirculation end cap at the other end. Each of these rectangular-cuboid-tanks are stacked inside a first intermodal container having dimensions of about 8 ft by about 53 ft by about 9.6 ft. The re-circulating aquaculture system (RAS) module is made up of pumps, connections and valves forming independently connected closed loop recirculation from the RAS module to each production sub-unit module's rectangular-cuboid-tank contained inside the first intermodal container. In a preferred embodiment, the re-circulating aquaculture system (RAS) is contained within a second intermodal container.

The preferred modularized shrimp production system contains certain equipment and/or devices for monitoring, maintaining, or altering the modularized shrimp production system. For example, such equipment may have a Program Logic Controller (PLC) for controlling a specific light level; a water circulation rate; a tank water level; a water temperature in a range of 29-33° C.; a pH concentration; a salinity concentration in the range of 10-14 parts per thousand; a dissolved oxygen level in a range greater than 4.5 mg/L; a nitrogen metabolite concentration; a sensor to detect the modulation of surface acoustic waves to sense a physical phenomenon; a total dissolved solids index; a visual event occurring in the tank; a live or a recorded visual event in the tank; or combination thereof.

In a preferred embodiment, the components for monitoring, maintaining, or altering the aquaculture environment for a synchronous production cycle of shrimp rely on the Program Logic Controller (PLC), which is essentially an industrial computer that controls different components or processes of the modularized shrimp production system and is programmed according to the operational requirements of the system. Numerous off-the-shelf and/or custom systems are available from Siemens, Allen Bradley (Rockwell) or numerous other custom PLC systems available from other vendors.

The preferred components for monitoring, maintaining, or altering the specific light level comprises light emitting diodes (LED's) mounted above the waterline of each production sub-unit are known in the art because LED's have been on the market for many years. The components for monitoring, maintaining, or altering the water circulation rate comprise pumps and valves are also available from numerous commercial manufactures. The components for monitoring, maintaining, or altering the tank water level comprise liquid level sensors. The components for monitoring, maintaining, or altering the water temperature comprises compressed air being pre-conditioned to 31° C. by passage through a heat exchanger before being dispersed into the water through micro-dispersion nozzles. The components for monitoring, maintaining, or altering the pH concentration comprises a pH probe. The components for monitoring, maintaining, or altering the salinity concentration in the range of 10-14 parts per thousand comprises conductivity sensors that measure water's capability to pass electrical flow and alert a user or make adjustments directly. The components for monitoring, maintaining, or altering the dissolved oxygen level in a range greater than 4.5 mg/L comprises a dissolved oxygen sensors of the polarographic, rapid-pulsing, galvanic and optical type. The components for monitoring, maintaining, or altering the nitrogen metabolite concentration comprise sensors that alert a user. Manufacturers of many sensors mentioned above include YSI by Xylem, Pentair Aquatic, Campbell Scientific, AQ1, Ametek, and Hach.

Preferred component for monitoring, maintaining, or altering the sensor to detect the modulation of surface acoustic waves to sense a physical phenomenon comprises acoustic feeding sensors such as ones from AQ1 Systems. More specifically, the SF200 Sound Feeding System for Shrimp is the world's first sensor-based feeding control system for shrimp farmers. The system uses passive acoustics to identify shrimp feeding activity and then uses that information to control temporal feed delivery via an adaptive feeding algorithm. The adaptive algorithm ensures feed delivered matches shrimp appetite so that all animals are fed fully without waste 24 hours a day if required.

Moreover, the preferred components for monitoring, maintaining, or altering the live or the recorded visual event occurring in the tank comprises a Charge Coupled TV ("CCTV") camera connected. One preferred model includes the infrared CCTV Model: Water Proof BW® 700TVL sold by the BW Group, China. Other models include the Hikvision DS-2CD2012-I-4 MM 1.3 MP Outdoor Bullet IP Camera from Hikvision USA, City of Industry, Calif.

Another preferred embodiment of the modularized shrimp production system includes a high-pressure water line with a computer-controlled actuator valve routed above each production sub-unit. Using this configuration, high pressure water can be released into each production sub-unit in pulses starting from the recirculation end cap and forcing the shrimp to move towards the harvest pit to facilitate harvesting of shrimp.

The preferred re-circulating aquaculture system (RAS) described above includes a storage reservoir tank in fluid connection with a closed loop system. The closed loop system includes a Moving Bed Bio-Reactor (MBBR) in fluid connection with a pump. The preferred pump is in fluid connection with the production sub-unit. The preferred production subunit is in fluid connection with a Micro-Screen Drum Filter used to remove detritus. The preferred Micro-Screen Drum Filter is in fluid connection with the MBBR and an Up-flow Anaerobic Sludge Blanket Reactor. The preferred MMBR has a fluid connection to a foam fractionator used to remove emulsified proteinaceous materials from the water and returned the water to the MBBR. The preferred foam fractionator has a fluid connection to the Up-flow Anaerobic Sludge Blanket Reactor that is used for processing and removing sludge to be used as high nitrogen fertilizer or landfill. The preferred up-flow Anaerobic Sludge Blanket Reactor is in fluid connection with a recycled water storage tank. The preferred storage reservoir tank is in fluid communication with a filtered natural seawater tank or a well water tank that is in fluid connection with a mixing tank used for mixing water and sea salt to a desired salinity to be transferred to the storage reservoir tank.

The shallow water tanks and rectangular-cuboid-tanks can be fabricated from materials including: fiberglass, wood composites, synthetic plastics, polyethylene, propylene, acrylonitrile butadiene, styrene, epoxy coated steel, metals, or combination thereof. However, other building materials that are known in the art may also be utilized for tank production and would be considered within the spirit and scope of the invention. Each of the rectangular-cuboid-tanks can be constructed with multiple ports that are inserted through the tank walls to allow for placement of micro-dispersion nozzles for aeration, directional nozzles through which water reprocessed using the recycling aquaculture system (RAS) that can be pumped to circulate water in any direction but a preferred counter-clockwise direction in each tank. Additionally, the preferred harvest pit for each rectangular-cuboid-tanks is constructed with outlets for collection and removal of detritus as well as harvesting of shrimp. The preferred shallow water tanks and rectangular-cuboid-tanks have been designed with certain dimensions so they can be placed inside a container.

EXAMPLE 2

A second embodiment of the current invention includes a method for having a synchronous production cycle of mature shrimp using a modularized shrimp production system. The preferred method comprises:
a. preparing an aquaculture environment for a synchronous production cycle of shrimp;
b. stocking post larvae shrimp in a post-larvae nursery module;
c. raising post larvae shrimp to a juvenile stage shrimp in the post-larvae nursery module to a desired size, forming a first-phase-shrimp population;
d. transferring the first-phase-shrimp to a production sub-unit rectangular-cuboid-tank;
e. growing the juvenile stage shrimp in the production sub-unit rectangular-cuboid-tank for a first period of time (i.e., until the shrimp reach a desired size), forming a second phase-shrimp population;
f. dividing the second-phase shrimp population into two separate production sub-unit rectangular-cuboid-tanks;
g. growing the second-phase-shrimp population in each of the two separate production sub-unit rectangular-cuboid-tanks for a second period of time (i.e., until the shrimp reach a desired size) forming a third-phase-shrimp population;
h. harvesting a portion of the third-phase shrimp population;
i. dividing the third-phase shrimp population into two separate production sub-unit rectangular-cuboid-tanks;
j. growing the third-phase-shrimp population in each of the two separate production sub-unit rectangular-cuboid-tanks for a third period of time (i.e., until the shrimp reach a desired size) forming a fourth-phase-shrimp population; and
k. harvesting of the fourth-phase shrimp population.

The preferred embodiment establishes a synchronous production cycle by repeating steps (a) through (k) and assuring that the production sub-unit rectangular-cuboid-tanks of the modularized shrimp production system are restocked as soon as they are emptied by the respective dividing of different shrimp populations. Additionally, the steps could be continued for a fifth-phase shrimp population or beyond. An extension of the number of phases possible with the modularized shrimp production system would depend on the scale of production needed. However, if the modules could be increased, the number of x-phase shrimp populations could be extended and would be considered within the spirit and scope of this invention.

The preferred invention understands that all shrimp growth phases and basic operations are modularized and integrated to form a multi-phasic synchronous super-intensive shrimp production system controlled by a custom designed cyber-physical platform that acquires data through sensors embedded in post-larvae nursery module(s), production sub-unit module(s) (i.e. same as grow-out production module), recirculating aquaculture system (RAS) module(s), and feed distribution module(s) that allows regulation of all aspects by Program Logic Controllers (PLCs) integrated with Human Interface Modules (HIMs) through coupled feed-back loops. The preferred shrimp growing conditions include having the optimal conditions for lighting, feeding, water temperature, water level, water pH and water saline concentrations that are conducive for optimal and efficient shrimp maturation. Because the modularized aquaculture system allows shrimp to be farmed in any climate, it is understood by one having ordinary skill in the art that some of these parameters may need to be optimized based on geography (i.e., humidity, elevation, temperature, etc.). The preferred post-larvae nursery module has at least one shallow water tank for producing juvenile shrimp, wherein the post-larvae nursery module is in fluid connection a post-larvae re-circulating water system ("PLRAS") module, a feed distribution module, and a computer control module.

The preferred rectangular-cuboid-tank has a raised lengthwise depth-line that is shallower in middle of the tank when filled with water. The harvest pit structure is located at one end of the tank and a cap structure is located at the other end of the tank. The preferred rectangular cuboid tank of the production sub-unit module is capable of holding water and fitted with at least one valve for introducing and evacuating water. The preferred re-circulating aquatic system is in fluid communication with the post-larvae nursery module and the production sub-unit module; wherein the feed distribution module is in fluid communication with each production sub-unit in a production module. The preferred computer control module is interfaced with human interface modules ("HIMs") and one or more equipment devices that are connected to the post-larvae nursery module, the production sub-unit module, the re-circulating aquaculture system module, or the feed distribution module.

A preferred method includes stocking post larvae shrimp at a density of 4,000-8,000/m2 into each vertically stacked shallow water tanks installed in the nursery module. Additionally, the preferred aquaculture environment for a synchronous production cycle of shrimp is preserved by monitoring, maintaining or altering: a specific light level; a water circulation rate; the shallow water tank water level the range of 30-50 cm; the shallow water tank water level above 35 cm; a water temperature in a range of 29-33° C.; a pH concentration; a salinity concentration in the range of 10-14 parts per thousand; a dissolved oxygen level in a range greater than 4.5 mg/L; a nitrogen metabolite concentration; a sensor to detect the modulation of surface acoustic waves to sense a physical phenomenon; a total dissolved solids index; a visual event occurring in the tank; a live or a recorded visual event in the tank; or combination thereof. A more preferred method for preparing the aquaculture environment is by using compressed air that is pre-conditioned to 31° C. by passage through a heat exchanger in the nursery module before being dispersed into nursery tank water through micro-dispersion nozzles.

Moreover, preparing and maintaining the aquaculture environment is aided by embedding each production sub-unit with sensors for water temperature, water level, salinity, dissolved oxygen, pH, total dissolved solid (TDS), nitrogen metabolite levels (ammonia, nitrites, nitrates) as well as acoustics (feeding activity). In short, most if not all physical and chemical measurement data are connected via a cyber-physical platform through a Program Logic Controller (PLC) integrated with Human Interface Modules (HIMs) for real-time feedback and adjustments.

Preparing the aquaculture environment includes using a computer-controlled feed distribution system that draws feed from one of four or more different feeds from attached hoppers. The dry feed is then hydrated and dispensed to a targeted production sub-unit based on signals from the Program Logic Controller (PLC).

Another method of preparing the aquaculture environment includes embedding in each production sub-unit with sensors for monitoring, maintaining, or altering the modularized shrimp production system using a Program Logic Controller (PLC) for controlling different components or processes of the modularized shrimp production system, wherein the PLC is programmed according to the operational requirements of the system. The preferred components for monitoring, maintaining, or altering the specific light level comprises light emitting diodes (LED's) mounted above the waterline of each production sub-unit. The preferred components for monitoring, maintaining, or altering the water circulation rate comprise pumps and valves. The preferred components for monitoring, maintaining, or altering the tank water level comprise liquid level sensors. The preferred components for monitoring, maintaining, or altering the water temperature comprises compressed air being pre-conditioned to 31° C. by passage through a heat exchanger before being dispersed into the water through micro-dispersion nozzles. The preferred components for monitoring, maintaining, or altering the pH concentration include a pH probe or other means for measuring pH. The preferred components for monitoring, maintaining, or altering the salinity concentration in the range of 10-14 parts per thousand include conductivity sensors that measure water's capability to pass electrical flow and alert a user or make adjustments directly. The preferred components for the components for monitoring, maintaining or altering the dissolved oxygen level in a range greater than 4.5 mg/L comprises a dissolved oxygen sensors of the polarographic, rapid-pulsing, galvanic and optical type; the components for monitoring, maintaining or altering the nitrogen metabolite concentration comprises sensors that alert a user; the component for monitoring, maintaining or altering the sensor to detect the modulation of surface acoustic waves to sense a physical phenomenon comprises; the components for monitoring, maintaining or altering the total dissolved solids index comprises sensors that alert a user; the components for monitoring, maintaining or altering the live or the recorded visual event occurring in the tank comprises a Charge Coupled TV ("CCTV") camera connected.

A preferred method of harvesting shrimp involves using high pressure water lines routed above each production sub-unit and connected to computer-controlled actuator valves activated in pulses starting from the recirculation end cap moving towards the harvest pit.

Although only exemplary embodiments of the invention are specifically described above, it will be appreciated that modifications and variations of these examples are possible without departing from the spirit and intended scope of the invention. For example, one of ordinary skill in the art will appreciate that measurements, particularly of raceway dimensions, shrimp weight and time are approximate and may be varied to some degree without departing from the spirit and scope of the invention. One of ordinary skill in the art will also appreciate that in most instances, the weight of the water contained accounts for most of the production sub-unit weight. Accordingly, it may be possible to vertically arrange production sub-units having walls higher than described herein, but in which water depth is nevertheless around the recited wall heights. The sides of the container in which the production sub-units are installed effectively become an extension of the production sub-unit sides.

One of ordinary skill in the art will appreciate that production assemblies and production sub-units fabricated herein can be of various measurements. Intermodal containers are generally available in lengths of 20 ft (6.1 m), 40 ft (12.2 m), 45 ft (13.7 m) and 53 ft (16.5 m) lengths and are produced having variable heights. It is also possible to link containers in multiple iterations and fabricate production sub-units inside so as to create increased shrimp production. Without limitation it is conceivable that container like rigid structures can be constructed having width, length, and height different from generally available containers. Such structures again would open the possibility of significantly increasing shrimp production. A structure so described may in fact be a freestanding building connected to Nursery, RAS, and Feed Modules along with a computer activated controls. Production models like the modules described herein, are exemplary and revising these modules to meet market demands are considered to be within the sprit and scope of the invention.

What is claimed is:

1. A modularized shrimp production system, comprising:
    one or more production sub-unit modules comprising:
        one or more tanks capable of holding water, wherein a water depth in each tank is maintained between a minimum depth not less than 10 cm and a maximum depth not more than 100 cm; and
        one or more sensors;
    a recirculating aquaculture system module coupled to the one or more production sub-unit modules;
    a feed distribution module coupled to the one or more production sub-unit modules; and
    a computer control module linked to one or more of:
        the one or more production sub-unit modules;
        the recirculating aquaculture system module; and
        the feed distribution module;
    the computer control module configured to acquire data through the sensors and to control the recirculating aquaculture system module, the feed distribution module, and each of the production sub-unit modules using one or more program logic controllers, the computer control module configured to use feedback loops for maintaining an aquaculture environment in the one or more tanks for a synchronous production cycle of shrimp at least by drawing one of a plurality of feeds from a feed distribution module feed hopper and dispensing the feed to a targeted production sub-unit module tank based, at least in part, on one or more signals from the one or more program logic controllers.

2. The modularized shrimp production system of claim 1, wherein the water depth in each of the one or more tanks is maintained between a minimum depth not less than 30 cm and a maximum depth not more than 60 cm.

3. The modularized shrimp production system of claim 1, further comprising:
    a post-larvae nursery module coupled to a post-larvae recirculating aquaculture system module and the feed distribution module, the post-larvae nursery module linked to the computer control module, the post-larvae nursery module comprising one or more shallow water tanks; and
    wherein the computer control module is further configured to acquire data from one or more post-larvae nursery module sensors and configured to control the modularized shrimp production system with the one or more program logic controllers for maintaining an aquaculture environment for a synchronous production cycle of post-larvae shrimp to produce juvenile shrimp.

4. The modularized shrimp production system of claim 3, wherein the post-larvae nursery module comprises one or more shallow water tanks sloped toward a stand-pipe situated in a corner of each tank; and wherein the water depth in each shallow water tank is independently maintained by circulation from a storage tank.

5. The modularized shrimp production system of claim 4, wherein two or more shallow water tanks are stacked on each other with or without a cover over the tanks in the stack.

6. The modularized shrimp production system of claim 4, wherein the post-larvae nursery module comprises a plurality of the post-larvae nursery module shallow water tanks stacked inside a post-larvae-nursery intermodal container; and wherein a diverter valve and a pump maintain water levels by circulation from a water storage tank.

7. The modularized shrimp production system of claim 4, wherein the one or more tanks capable of holding water have a harvest pit structure located at one end of each tank and a cap structure located at another end of the tank.

8. The modularized shrimp production system of claim 1, wherein each of the one or more production sub-unit modules comprise two or more tanks arranged in a stack; and wherein the recirculating aquaculture system module further comprises pumps, connections, and valves forming an independently connected closed loop recirculation from the recirculating aquaculture system module to each tank in the stack.

9. The modularized shrimp production system of claim 8, wherein the two or more tanks are stacked on each other with a cover over the tanks in the resulting stack.

10. The modularized shrimp production system of claim 1, further comprising:

a high pressure water line having a computer controlled actuator valve routed above each production sub-unit tank and configured to release high pressure water into each production sub-unit tank in pulses starting from a cap structure moving towards a harvest pit structure to harvest shrimp.

11. The modularized shrimp production system of claim 1, wherein the recirculating aquaculture system further comprises:

a storage reservoir tank coupled to a closed loop system, the closed loop system comprising:
a moving bed bio-reactor coupled to a pump, the pump coupled to the one or more production sub-unit modules;
a micro-screen drum filter configured to remove detritus from system water and coupled to the one or more production sub-units and coupled to the moving bed bio-reactor;
an up-flow anaerobic sludge blanket reactor coupled to the moving bed bio-reactor and configured to process and remove sludge from system water as high nitrogen fertilizer or landfill material, the up-flow anaerobic sludge blanket reactor also coupled to a recycled water storage tank; and
a foam fractionator coupled to the moving bed bio-reactor and configured to remove emulsified proteinaceous materials from system water and return system water to the moving bed bio-reactor, the foam fractionator also coupled to the up-flow anaerobic sludge blanket reactor; and
either a filtered natural seawater tank coupled to the storage reservoir tank or a well water tank coupled to a mixing tank configured to mix water and sea salt to a desired salinity and to transfer mixed sea salt water to the storage reservoir tank.

12. The modularized shrimp production system of claim 1, wherein each of the one or more tanks further comprise multiple ports inserted through tank walls, each port comprising:

a micro-dispersion nozzle configured to aerate water; or
a directional nozzle in fluid connection with the recirculating aquaculture system module and configured to circulate water clockwise or counter-clockwise in the tank.

13. The modularized shrimp production system of claim 1, wherein a harvest pit structure for each of the one or more tanks comprises outlets configured to collect and remove detritus and/or to harvest shrimp.

14. The modularized shrimp production system of claim 1, wherein a harvest pit structure comprises at least one screened outlet that is permeable to waste but not shrimp, the screened outlet configured to pass waste from the one or more production sub-unit modules to the recirculating aquaculture system module, the harvest pit structure further comprising at least one shrimp transfer outlet configured to pass shrimp and water to another production sub-unit module.

15. The modularized shrimp production system of claim 1, wherein the feed distribution module, under direction of the computer control module, draws the one of a plurality of feeds from a respective feed distribution module feed hopper, hydrates the drawn feed, and dispenses hydrated feed to the targeted production sub-unit tank based, at least in part, on one or more signals from the one or more program logic controllers.

16. A method for synchronous production of mature shrimp using a modularized shrimp production system, the method comprising:

a. stocking post-larvae shrimp in a post-larvae nursery module;
b. raising post-larvae shrimp to juvenile stage shrimp in the post-larvae nursery module, forming a first-phase-shrimp population;
c. transferring the first-phase-shrimp population to a first production sub-unit tank;
d. growing the juvenile stage shrimp in the first production sub-unit tank for a first period of time, forming a second phase-shrimp population;
e. dividing the second-phase shrimp population into two second production sub-unit tanks;
f. growing the second-phase-shrimp population in each of the two second production sub-unit tanks for a second period of time forming a third-phase-shrimp population;
g. harvesting a portion of the third-phase shrimp population;
h. dividing an unharvested portion of the third-phase shrimp population into two third production sub-unit tanks;
i. growing the unharvested portion of third-phase-shrimp population in each of the two third production sub-unit tanks for a third period of time forming a fourth-phase-shrimp population;
j. harvesting at least a portion of the fourth-phase shrimp population; and
k. maintaining an aquaculture environment in the post-larvae nursery module and the first, second, and third production sub-units, by a computer control module, acquiring data through sensors disposed in the post-larvae nursery module, in the first, second, and third production sub-units, in a recirculating aquaculture system module, and in a feed distribution module;

wherein the post-larvae nursery module has at least one shallow water tank for producing juvenile stage shrimp, the tank being capable of holding water and fitted with one or more valves for introducing and evacuating water and having a post-larvae nursery module harvest pit structure located at one end of each tank and a cap structure located at another end of the tank;

the tank having a raised lengthwise depth-line that is more shallow in the middle of the tank; and wherein a recirculating aquatic system is in fluid communication with the post-larvae nursery module and the production sub-unit tanks.

17. The method of claim 16, wherein harvesting at least the portion of the fourth-phase shrimp population comprises:

l. dividing an unharvested portion of the fourth-phase shrimp population into two fourth production sub-unit tanks; and m. growing the fourth-phase-shrimp population in each of the two fourth production sub-unit tanks for a fourth period of time forming a fifth-phase-shrimp population; and n. harvesting the fifth-phase shrimp population.

18. The method of claim 16 further comprising:

passing waste from the production sub-unit modules to the recirculating aquaculture system module via a production sub-unit module harvest pit structure defined by each production sub-unit tank, wherein the production sub-unit module harvest pit structure comprises at least one screened outlet that is permeable to waste but not shrimp; and harvesting shrimp via at least one shrimp transfer outlet in the production sub-unit module harvest pit structure further configured to pass shrimp and water to another production sub-unit module.

19. The method of claim 16, wherein maintaining the aquaculture environment in the first, second and third production sub-units further comprises:

drawing the one of a plurality of feeds from a respective one of a plurality of feed hoppers by a feed distribution module controlled by the computer control module;

hydrating the feed; and dispensing hydrated feed to a targeted production sub-unit tank based, at least in part, on one or more signals from one or more program logic controllers.

20. The method of claim 16, further comprising:

routing one or more high water pressure lines above each production sub-unit tank;

connecting each high water pressure line to one or more computer control module controlled actuator valves; and harvesting shrimp by activating, by the computer control module, the one or more actuator valves in pulses, starting from an end cap of a respective tank and moving towards the production sub-unit module harvest pit structure of that tank.

* * * * *